US009206313B2

(12) United States Patent
Monden

(10) Patent No.: US 9,206,313 B2
(45) Date of Patent: Dec. 8, 2015

(54) POLYCARBONATE RESIN COMPOSITION

(71) Applicant: MITSUBISHI ENGINEERING-PLASTICS CORPORATION, Minato-ku (JP)

(72) Inventor: Toshiki Monden, Kanagawa (JP)

(73) Assignee: Mitsubishi Engineering-Plastics Corporation, Minato-ku (JP)

(*) Notice: Subject to any disclaimer, the term of this patent is extended or adjusted under 35 U.S.C. 154(b) by 0 days.

(21) Appl. No.: 14/375,285

(22) PCT Filed: Jan. 29, 2013

(86) PCT No.: PCT/JP2013/051818
§ 371 (c)(1),
(2) Date: Jul. 29, 2014

(87) PCT Pub. No.: WO2013/115151
PCT Pub. Date: Aug. 8, 2013

(65) Prior Publication Data
US 2015/0025180 A1  Jan. 22, 2015

(30) Foreign Application Priority Data

| Jan. 31, 2012 | (JP) | 2012-017424 |
| Feb. 2, 2012 | (JP) | 2012-020443 |
| Feb. 2, 2012 | (JP) | 2012-020445 |
| Feb. 6, 2012 | (JP) | 2012-022603 |
| Feb. 6, 2012 | (JP) | 2012-022604 |
| Feb. 8, 2012 | (JP) | 2012-024613 |
| Feb. 8, 2012 | (JP) | 2012-024614 |
| Feb. 15, 2012 | (JP) | 2012-030244 |
| Jul. 17, 2012 | (JP) | 2012-158318 |
| Aug. 21, 2012 | (JP) | 2012-182015 |
| Sep. 13, 2012 | (JP) | 2012-201177 |
| Sep. 13, 2012 | (JP) | 2012-201536 |
| Oct. 2, 2012 | (JP) | 2012-220525 |
| Oct. 5, 2012 | (JP) | 2012-222743 |

(51) Int. Cl.
*C08L 69/00* (2006.01)
*C08J 3/22* (2006.01)
*C08K 5/5399* (2006.01)
*C08K 7/04* (2006.01)

(52) U.S. Cl.
CPC .. *C08L 69/00* (2013.01); *C08J 3/22* (2013.01); *C08K 5/5399* (2013.01); *C08K 7/04* (2013.01); *C08L 2201/02* (2013.01); *C08L 2205/035* (2013.01)

(58) Field of Classification Search
CPC .......... C08K 5/5399; C08K 3/40; C08K 7/04; C08K 5/0066; C08K 5/5353; C08K 7/14; C08L 69/00; C08L 2201/02; C08L 2205/035; C08J 3/22

USPC .......................... 524/138, 494, 115
See application file for complete search history.

(56) References Cited

U.S. PATENT DOCUMENTS

| 5,663,276 | A  * | 9/1997 | Yoneta et al. | 528/194 |
| 6,528,559 | B1 * | 3/2003 | Nakacho et al. | 524/116 |
| 6,627,122 | B1 * | 9/2003 | Tada et al. | 252/601 |
| 7,550,523 | B2 * | 6/2009 | Lim et al. | 524/138 |
| 7,759,418 | B2 * | 7/2010 | Murakami et al. | 524/186 |
| 2003/0092805 | A1 * | 5/2003 | Seidel et al. | 524/127 |
| 2004/0039134 | A1 * | 2/2004 | Murakami et al. | 525/410 |
| 2004/0122139 | A1 * | 6/2004 | Yang et al. | 524/115 |
| 2004/0127734 | A1 * | 7/2004 | Nakano et al. | 558/81 |
| 2009/0088515 | A1 * | 4/2009 | Yagyu et al. | 524/494 |
| 2010/0292381 | A1 * | 11/2010 | Kamikawa | 524/394 |
| 2012/0129990 | A1 * | 5/2012 | Kikuchi et al. | 524/143 |
| 2012/0289655 | A1 * | 11/2012 | Sumita et al. | 525/67 |
| 2014/0066560 | A1 * | 3/2014 | Stoppelmann et al. | 524/407 |

FOREIGN PATENT DOCUMENTS

| AT | 2003261725 A1 | 4/2004 |
| CN | 1681906 A | 10/2005 |
| JP | 09-048912 | 2/1997 |
| JP | 10-030056 | 2/1998 |
| JP | 10-046017 | 2/1998 |
| JP | 2000-226508 | 8/2000 |
| JP | 2002-265767 | 9/2002 |
| JP | 2002-302597 | 10/2002 |
| JP | 2003-213116 | 7/2003 |
| JP | 2006-176612 | 7/2006 |
| JP | 2006-307178 | 11/2006 |

(Continued)

OTHER PUBLICATIONS

International Search Report issued Apr. 23, 2013, in PCT/JP13/051818, filed Jan. 29, 2013.

(Continued)

*Primary Examiner* — Randy Gulakowski
*Assistant Examiner* — Christopher M Rodd
(74) *Attorney, Agent, or Firm* — Oblon, McClelland, Maier & Neustadt, L.L.P.

(57) ABSTRACT

Provided is a polycarbonate resin composition that can exhibit an improved flame retardancy, flowability, rigidity, warping resistance, impact resistance, heat resistance, and wet heat stability all at the same time. This polycarbonate resin composition comprises 3 to 30 mass parts of (C) a phosphazene compound and 0.001 to 1 mass parts of (D) a fluoropolymer per 100 mass parts of the total of a component (A) and a component (B) formed of 40 to 95 mass % of (A) a polycarbonate resin and 5 to 60 mass % of (B) a filler selected from glass fillers and carbon fibers.

26 Claims, No Drawings

(56) References Cited

FOREIGN PATENT DOCUMENTS

| | | |
|---|---|---|
| JP | 2006-316168 | 11/2006 |
| JP | 2007-045906 | 2/2007 |
| JP | 2008-101035 | 5/2008 |
| JP | 2011-208111 | 10/2011 |
| JP | 2012-001580 | 1/2012 |
| JP | 2013-001801 | 1/2013 |
| KR | 2003-0008811 | 1/2003 |
| WO | WO 2004/024844 A1 | 3/2004 |
| WO | WO 2011087141 A1 * | 7/2011 |

OTHER PUBLICATIONS

European Search Report issued Sep. 11, 2015, in corresponding European Patent Application No. 13743627.

* cited by examiner

US 9,206,313 B2

POLYCARBONATE RESIN COMPOSITION

This application is a 371 of PCT/JP2013/051818, filed Jan. 29, 2013. Priority to Japanese patent application Nos. 2012-017424. filed Jan. 31, 2012 ; 2012-020443, filed Feb. 2, 2012; 2012-020445, filed Feb. 2, 2012; 2012-022603, filed Feb. 6, 2012; 2012-022604, filed Feb. 6, 2012; 2012-024613, filed Feb. 8, 2012; 2012-024614, filed Feb. 8, 2012; 2012-030244, filed Feb. 15, 2012; 2012-158318, filed Jul. 17. 2012; 2012-182015, filed Aug. 21, 2012; 2012-201177, filed Sep. 13, 2012; 2012-201536, filed Sep. 13, 2012; 2012-220525, Oct. 2, 2012; and 2012-222743, filed Oct. 5, 2012, is claimed.

TECHNICAL FIELD

The present invention relates to a polycarbonate resin composition that exhibits an excellent rigidity. More particularly, the present invention relates to a polycarbonate resin composition that exhibits an excellent flame retardancy, flowability, rigidity, impact resistance, and heat resistance.

BACKGROUND ART

Polycarbonate resins are resins that exhibit an excellent heat resistance and excellent mechanical and electrical properties and as a result are widely used as, for example, materials in the automotive sector, materials for electrical and electronic devices and equipment, materials for housing construction, and materials for the production of parts and components in other industrial sectors.

Within this sphere, flame-retardant polycarbonate resin compositions are advantageously used for components in, for example, information technology•mobile devices, e.g., computers, notebook computers, tablets, smart phones, and cell phones, and in office equipment, e.g., printers and copiers.

Electronic and electrical devices, and most prominently the information technology•mobile devices referenced above, have been getting smaller and thinner in recent years, and as a consequence there is demand that the materials used here be materials that, even in thin-wall configurations, are highly flame retardant and also exhibit an excellent rigidity.

Various strategies for increasing the rigidity of polycarbonate resins have been examined, and the strategy of incorporating a fibrous reinforcement, e.g., a glass fiber, is the most effective in responding to the demand for high rigidity for thin-wall configurations. The incorporation of a halogenated flame retardant in the polycarbonate resin has been used as means for imparting flame retardancy to such glass fiber-reinforced polycarbonate resins. However, polycarbonate resin compositions that incorporate a halogenated flame retardant, which contains chlorine or bromine, have been subject to a reduction in thermal stability and during molding operations have caused corrosion of the screw and molding tools in the molding equipment.

Glass fiber-reinforced polycarbonate resin compositions that incorporate an organophosphate ester are frequently used as an alternative strategy to the preceding (refer, for example, to Patent Documents 1 to 3).

However, it is difficult to respond to the recent requirements for thin-wall flame retardancy using resin compositions that incorporate an organophosphate ester flame retardant, and a drawback to such resin compositions has been that a substantial decline in the impact resistance and heat resistance occurs at the high levels of incorporation that will provide a high flame retardancy. In addition, due to the high specific gravity, it has not been possible with glass-reinforced polycarbonate resins to obtain the compact high-strength moldings that have come to be required in recent years.

In response to this, carbon fiber-reinforced polycarbonate resins that incorporate carbon fiber and organophosphate ester have been introduced (refer, for example, to Patent Documents 4 to 6).

However, a problem has been that such carbon fiber-reinforced polycarbonate resins still exhibit a reduced flame retardancy and heat resistance. Another problem has been that carbon fiber-blended polycarbonate resins also exhibit a substantial reduction in impact resistance.

Thus, while there has been strong demand for a polycarbonate resin composition that presents an excellent balance between the flame retardancy and the flowability, rigidity, impact resistance, and heat resistance, a resin composition having such properties has still not appeared.

In addition, a fatal drawback to the use of phosphazene compounds as flame retardants has been that they undergo consolidation or solidification upon exposure to compression or shear, and as a consequence, when they are blended into a thermoplastic resin by melt-mixing, the blend sticks or seizes and handling at an industrial level is thus quite problematic.

In order to solve this problem, a flame retardant masterbatch has been proposed in which a phosphazene compound is blended with a polyester resin, a polycarbonate resin, and a polyester elastomer (refer to Patent Document 7), and a flame retardant masterbatch formed of a phosphazene compound and a phenolic resin has also been proposed (refer to Patent Document 8).

However, the blending of such a flame retardant masterbatch into polycarbonate resin has not been able to effectively realize flame retardancy for the polycarbonate resin composition because the polyester elastomer and polyester resin, e.g., polyethylene terephthalate resin, or phenolic resin present in the flame retardant masterbatch cause a reduction in the flame retardancy.

In addition, since masterbatching by melt-mixing with a thermoplastic resin imposes a substantial thermal history, a problem has been that polycarbonate resin compositions that use a masterbatch undergo discoloration as a result.

CITATION LIST

Patent Literature

[Patent Document 1] Japanese Patent Application No. H8-201638 (Japanese Patent Application Laid-open No. H10-46017)

[Patent Document 2] Japanese Patent Application Laid-open No. H10-30056

[Patent Document 3] Japanese Patent Application Laid-open No. 2006-176612

[Patent Document 4] Japanese Patent Application Laid-open No. H9-48912

[Patent Document 5] Japanese Patent Application Laid-open No. 2000-226508

[Patent Document 6] Japanese Patent Application Laid-open No. 2002-265767

[Patent Document 7] Japanese Patent Application Laid-open No. 2006-307178

[Patent Document 8] Japanese Patent Application Laid-open No. 2008-101035

SUMMARY OF INVENTION

Technical Problem

The present invention was created considering the problems indicated above, and an object of the present invention is therefore to provide a polycarbonate resin composition that, even when converted into a thin-walled molding, has a very high flame retardancy and also an excellent rigidity, flowability, warping resistance, impact resistance, and heat resistance.

Additional objects are to provide a granular phosphazene compound that supports an excellent productivity and that also has an excellent processing behavior during melt-mixing with a resin, to provide a polycarbonate resin composition that comprises this granular phosphazene compound, and to provide a method of producing a polycarbonate resin composition.

Solution to Problem

As a result of extensive investigations in order to solve the problems indicated above, the inventor of the present invention surprisingly discovered that a polycarbonate resin composition having a very high flame retardancy and also an excellent flowability, rigidity, impact resistance, and heat resistance is obtained by incorporating a special glass filler and/or carbon fiber, a phosphazene compound, and a fluoropolymer in a polycarbonate resin, and achieved the present invention as a result.

The present invention provides a polycarbonate resin composition as follows.

[1] A polycarbonate resin composition comprising 3 to 30 mass parts of (C) a phosphazene compound and 0.001 to 1 mass parts of (D) a fluoropolymer per 100 mass parts of the total of a component (A) and a component (B) formed of 40 to 95 mass % of (A) a polycarbonate resin and 5 to 60 mass % of (B) a filler selected from glass fillers and carbon fibers.

[2] The polycarbonate resin composition according to [1], wherein the glass filler is at least one selection from glass fibers, flat cross-section glass fibers, glass flakes, milled glass fibers, and glass beads.

[3] The polycarbonate resin composition according to [2], wherein the flat cross-section glass fiber is a flat cross-section glass fiber that has an average value of 10 to 50 µm for a major diameter of the fiber cross section and an average value of 1.5 to 8 for a ratio between the major diameter and a minor diameter (major diameter/minor diameter).

[4] The polycarbonate resin composition according to [2], wherein the glass flake has an average thickness of 0.2 to 10 µm.

[5] The polycarbonate resin composition according to [2], wherein the milled glass fiber is a glass short fiber for which the ratio of an average fiber length to an average fiber diameter is not more than 10.

[6] The polycarbonate resin composition according to [2], wherein the glass filler comprises the glass fiber and the glass flake in a glass fiber/glass flake mass ratio of 5/95 to 95/5.

[7] The polycarbonate resin composition according to [2], wherein the glass filler comprises the flat cross-section glass fiber and the glass flake in a flat cross-section glass fiber/glass flake mass ratio of 5/95 to 95/5.

[8] The polycarbonate resin composition according to [1], wherein the filler (B) comprises a glass fiber and the carbon fiber in a glass fiber/carbon fiber mass ratio of 5/95 to 95/5.

[9] The polycarbonate resin composition according to [1], wherein the filler (B) comprises a flat cross-section glass fiber and the carbon fiber at a flat cross-section glass fiber/carbon fiber mass ratio of 5/95 to 95/5.

[10] The polycarbonate resin composition according to [1], wherein the phosphazene compound (C) is an aromatic phosphazene compound.

[11] The polycarbonate resin composition according to [1], comprising 0.5 to 10 mass parts of (E) an elastomer per 100 mass parts of the total of the polycarbonate resin (A) and the filler (B).

[12] The polycarbonate resin composition according to [11], wherein the elastomer (E) is a graft copolymer obtained by graft polymerization on a rubbery polymer of at least one selection from aromatic vinyl compounds, vinyl cyanide, and (meth)acrylate ester compounds.

[13] The polycarbonate resin composition according to [1] or [11], comprising 0.5 to 20 mass parts of (F) a styrenic resin per 100 mass parts of the total of the polycarbonate resin (A) and the filler (B).

[14] The polycarbonate resin composition according to [12], wherein the styrenic resin (F) is an ABS resin and/or a styrene-acrylonitrile-type resin.

[15] The polycarbonate resin composition according to [1], wherein the phosphazene compound (C) is a granular phosphazene compound that has a percentage retained on a sieve with an aperture of 400 µm of at least 55 mass % and that has a bulk density of 0.3 to 1.5 g/mL.

[16] The polycarbonate resin composition according to [1] or [15], wherein the phosphazene compound (C) is a granular phosphazene having a bulk density of 0.4 to 1.5 g/mL and obtained by mixing (G) a polycarbonate resin particulate having a percentage passing a sieve with an aperture of 1000 µm of at least 30 mass %, into a phosphazene compound at a (C)/(G) mass ratio of 85/15 to 5/95.

The present invention also provides the granular phosphazene, polycarbonate resin composition comprising this granular phosphazene, and polycarbonate resin composition described in the following.

[17] A granular phosphazene compound that has a percentage retained on a sieve with an aperture of 400 µm of at least 55 mass % and that has a bulk density of 0.3 to 1.5 g/mL.

[18] The granular phosphazene compound according to [17], wherein the phosphazene compound is an aromatic phosphazene compound.

[19] The granular phosphazene compound according to [17] or [18], that is a flame retardant for polycarbonate resins.

[20] A polycarbonate resin composition comprising a polycarbonate resin and the granular phosphazene compound according to any of [17] to [19].

[21] A method of producing a polycarbonate resin composition, comprising melt-mixing a polycarbonate resin and the granular phosphazene compound according to any of [17] to [19] using an extruder.

[22] A granular phosphazene having a bulk density of 0.4 to 1.5 g/mL and obtained by mixing (G) a polycarbonate resin particulate having a percentage passing a sieve with an aperture of 1000 µm of at least 30 mass %, into a phosphazene compound (C) at a (C)/(G) mass ratio of 85/15 to 5/95.

[23] The granular phosphazene according to [22], wherein the polycarbonate resin particulate (G) has a percentage passing a sieve with an aperture of 500 µm of at least 50 mass %.

[24] The granular phosphazene according to [22] or [23], wherein the polycarbonate resin particulate (G) has a percentage passing a sieve with an aperture of 106 µm of at least 50 mass %.

[25] The granular phosphazene according to any of [22] to [24], wherein the percentage retained on a sieve having an aperture of 1680 µm is at least 50 mass %.

[26] The granular phosphazene according to any of [22] to [25], wherein the phosphazene compound (C) is an aromatic phosphazene compound.

[27] A polycarbonate resin composition comprising a polycarbonate resin and the granular phosphazene according to any of [22] to [26].

[28] A method of producing a polycarbonate resin composition, comprising melt-mixing a polycarbonate resin and the granular phosphazene according to any of [22] to [26] using an extruder.

Advantageous Effects of Invention

The composite fiber-reinforced polycarbonate resin composition of the present invention can provide a simultaneous increase in the flame retardancy, flowability, rigidity, warping resistance, impact resistance, heat resistance, and wet heat stability.

The granular phosphazene compound of the present invention is a phosphazene compound that supports an excellent productivity and that also has an excellent processing behavior during melt-mixing with a resin. When a polycarbonate resin composition is prepared by melt-mixing this granular phosphazene compound with a polycarbonate resin using, for example, an extruder, problems such as sticking by the phosphazene compound to the extruder screw do not occur and the polycarbonate resin composition can be produced in a stable manner with good processability.

BEST MODE FOR CARRYING OUT THE INVENTION

The present invention is described in detail hereinbelow using, inter alia, embodiments and examples; however, the present invention is not limited to or by the embodiments and examples provided below and modifications and variants can be freely realized within a range that does not go beyond the essential features of the present invention.

In this Description, a range set up using "to" means that the first and second numerical values are included as the lower limit and upper limit, respectively.

[The Polycarbonate Resin Composition]

The polycarbonate resin composition of the present invention comprises 3 to 30 mass parts of (C) a phosphazene compound and 0.001 to 1 mass parts of (D) a fluoropolymer per 100 mass parts of the total of a component (A) and a component (B) formed of 40 to 95 mass % of (A) a polycarbonate resin and 5 to 60 mass % of (B) a filler selected from glass fillers and carbon fibers.

[The Polycarbonate Resin (A)]

There are no limitations on the species of polycarbonate resin used in the polycarbonate resin composition of the present invention. In addition, a single species of polycarbonate resin may be used or any combination of two or more species in any ratio may be used.

The polycarbonate resin in the present invention is a polymer having the basic structure given by the following general formula and having the carbonate bond.

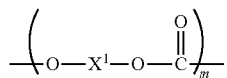

[C1]

$X^1$ in the formula is generally a hydrocarbon, but an $X^1$ incorporating a heteroatom or a heterobond may be used in order to impart various properties.

Polycarbonate resins can be classified into aromatic polycarbonate resins, in which the carbons directly bonded to the carbonate bond are each aromatic carbons, and aliphatic polycarbonate resins, in which the carbons directly bonded to the carbonate bond are each aliphatic carbons, and either type can be used. Aromatic polycarbonate resins are preferred here from the standpoint of the heat resistance, mechanical properties, and electrical properties.

There are no limitations on the specific species of the polycarbonate resin, and an example is a polycarbonate polymer obtained by the reaction of a dihydroxy compound and a carbonate precursor. For example, a polyhydroxy compound may also be reacted at this time in addition to the dihydroxy compound and carbonate precursor. A method may also be used in which carbon dioxide is used as the carbonate precursor and is reacted with a cyclic ether. The polycarbonate polymer may be straight chain or branched chain. In addition, the polycarbonate polymer may be a homopolymer composed of a single repeat unit or may be a copolymer having two or more repeat units. Such a copolymer may be selected from the various copolymerization modes, e.g., random copolymers, block copolymers, and so forth. These polycarbonate polymers generally form thermoplastic resins.

Among the starting monomers for aromatic polycarbonate resins, the aromatic dihydroxy compounds can be exemplified by the following:

dihydroxybenzenes such as 1,2-dihydroxybenzene, 1,3-dihydroxybenzene (i.e., resorcinol), and 1,4-dihydroxybenzene;

dihydroxybiphenyls such as 2,5-dihydroxybiphenyl, 2,2'-dihydroxybiphenyl, and 4,4'-dihydroxybiphenyl;

dihydroxynaphthalenes such as 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene, and 2,7-dihydroxynaphthalene;

dihydroxydiaryl ethers such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene, and 1,3-bis(4-hydroxyphenoxy)benzene;

bis(hydroxyaryl)alkanes such as
2,2-bis(4-hydroxyphenyl)propane (i.e., bisphenol A),
1,1-bis(4-hydroxyphenyl)propane,
2,2-bis(3-methyl-4-hydroxyphenyl)propane,
2,2-bis(3-methoxy-4-hydroxyphenyl)propane,
2-(4-hydroxyphenyl)-2-(3-methoxy-4-hydroxyphenyl)propane,
1,1-bis(3-tert-butyl-4-hydroxyphenyl)propane,
2,2-bis(3,5-dimethyl-4-hydroxyphenyl)propane,
2,2-bis(3-cyclohexyl-4-hydroxyphenyl)propane,
2-(4-hydroxyphenyl)-2-(3-cyclohexyl-4-hydroxyphenyl)propane,
α,α'-bis(4-hydroxyphenyl)-1,4-diisopropylbenzene,
1,3-bis[2-(4-hydroxyphenyl)-2-propyl]benzene,
bis(4-hydroxyphenyl)methane,
bis(4-hydroxyphenyl)cyclohexylmethane,
bis(4-hydroxyphenyl)phenylmethane,
bis(4-hydroxyphenyl)(4-propenylphenyl)methane,
bis(4-hydroxyphenyl)diphenylmethane,
bis(4-hydroxyphenyl)naphthylmethane,
1,1-bis(4-hydroxyphenyl)ethane,
1,1-bis(4-hydroxyphenyl)-1-phenylethane,
1,1-bis(4-hydroxyphenyl)-1-naphthylethane,
1,1-bis(4-hydroxyphenyl)butane,
2,2-bis(4-hydroxyphenyl)butane,
2,2-bis(4-hydroxyphenyl)pentane,
1,1-bis(4-hydroxyphenyl)hexane,
2,2-bis(4-hydroxyphenyl)hexane, 1,1-bis(4-hydroxyphenyl)octane,
2,2-bis(4-hydroxyphenyl)octane,
1,1-bis(4-hydroxyphenyl)hexane,
2,2-bis(4-hydroxyphenyl)hexane,
4,4-bis(4-hydroxyphenyl)heptane,
2,2-bis(4-hydroxyphenyl)nonane,
1,1-bis(4-hydroxyphenyl)decane, and
1,1-bis(4-hydroxyphenyl)dodecane;
bis(hydroxyaryl)cycloalkanes such as
1,1-bis(4-hydroxyphenyl)cyclopentane,
1,1-bis(4-hydroxyphenyl)cyclohexane,
4,4-bis(4-hydroxyphenyl)cyclohexane,
1,1-bis(4-hydroxyphenyl)-3,3-dimethylcyclohexane,
1,1-bis(4-hydroxyphenyl)-3,4-dimethylcyclohexane,
1,1-bis(4-hydroxyphenyl)-3,5-dimethylcyclohexane,
1,1-bis(4-hydroxyphenyl)-3,3,5-trimethylcyclohexane,
1,1-bis(4-hydroxy-3,5-dimethylphenyl)-3,3,5-trimethylcyclohexane,
1,1-bis(4-hydroxyphenyl)-3-propyl-5-methylcyclohexane,
1,1-bis(4-hydroxyphenyl)-3-tert-butylcyclohexane,
1,1-bis(4-hydroxyphenyl)-4-tert-butylcyclohexane,
1,1-bis(4-hydroxyphenyl)-3-phenylcyclohexane, and
1,1-bis(4-hydroxyphenyl)-4-phenylcyclohexane;
cardo structure-containing bisphenols such as
9,9-bis(4-hydroxyphenyl)fluorene and
9,9-bis(4-hydroxy-3-methylphenyl)fluorene;
dihydroxydiaryl sulfides such as
4,4'-dihydroxydiphenyl sulfide and
4,4'-dihydroxy-3,3'-dimethyldiphenyl sulfide;
dihydroxydiaryl sulfoxides such as
4,4'-dihydroxydiphenyl sulfoxide and
4,4'-dihydroxy-3,3'-dimethyldiphenyl sulfoxide; and dihydroxydiaryl sulfones such as
4,4'-dihydroxydiphenyl sulfone and
4,4'-dihydroxy-3,3'-dimethyldiphenyl sulfone.

Bis(hydroxyaryl)alkanes are preferred among the preceding; bis(4-hydroxyphenyl)alkanes are preferred among the bis(hydroxyaryl)alkanes; and 2,2-bis(4-hydroxyphenyl)propane (i.e., bisphenol A) is particularly preferred from the standpoint of the impact resistance and heat resistance.

A single aromatic dihydroxy compound may be used or any combination of two or more in any ratio may be used.

The starting monomer for aliphatic polycarbonate resins can be exemplified by alkanediols such as ethane-1,1-diol, propane-1,2-diol, propane-1,3-diol, 2,2-dimethylpropane-1,3-diol, 2-methyl-2-propylpropane-1,3-diol, butane-1,4-diol, pentane-1,5-diol, hexane-1,6-diol, and decane-1,10-diol;

cycloalkanediols such as cyclopentane-1,2-diol, cyclohexane-1,2-diol, cyclohexane-1,4-diol, 1,4-cyclohexanedimethanol, 4-(2-hydroxyethyl)cyclohexanol, and 2,2,4,4-tetramethylcyclobutane-1,3-diol;

glycols such as ethylene glycol, 2,2'-oxydiethanol (i.e., diethylene glycol), triethylene glycol, propylene glycol, and spiroglycol;

aralkyl diols such as 1,2-benzenedimethanol, 1,3-benzenedimethanol, 1,4-benzenedimethanol, 1,4-benzenediethanol, 1,3-bis(2-hydroxyethoxy)benzene, 1,4-bis(2-hydroxyethoxy)benzene, 2,3-bis(hydroxymethyl)naphthalene, 1,6-bis(hydroxyethoxy)naphthalene, 4,4'-biphenyldimethanol, 4,4'-biphenyldiethanol, 1,4-bis(2-hydroxyethoxy)biphenyl, bisphenol A bis(2-hydroxyethyl)ether, and bisphenol S bis(2-hydroxyethyl)ether; and cyclic ethers such as 1,2-epoxyethane (i.e., ethylene oxide), 1,2-epoxypropane (i.e., propylene oxide), 1,2-epoxycyclopentane, 1,2-epoxycyclohexane, 1,4-epoxycyclohexane, 1-methyl-1,2-epoxycyclohexane, 2,3-epoxynorbornane, and 1,3-epoxypropane.

With regard to the starting monomer for aromatic polycarbonate resins, the carbonate precursor can be exemplified by carbonyl halides and carbonate esters. A single carbonate precursor may be used or any combination of two or more in any ratio may be used.

The carbonyl halide can be specifically exemplified by phosgene and by haloformates such as the bischloroformates of dihydroxy compounds and the monochloroformates of dihydroxy compounds.

The carbonate esters can be specifically exemplified by diaryl carbonates such as diphenyl carbonate and ditolyl carbonate; dialkyl carbonates such as dimethyl carbonate and diethyl carbonate; and the carbonates of dihydroxy compounds, such as the biscarbonates of dihydroxy compounds, the monocarbonates of dihydroxy compounds, and cyclic carbonates.

The Polycarbonate Resin Production Method

There are no particular limitations on the method of producing the polycarbonate resin and any method may be used. Examples here are the interfacial polymerization method, melt transesterification method, pyridine method, methods that employ the ring-opening polymerization of cyclic carbonate compounds, and solid-phase prepolymer transesterification methods. Particularly suitable methods from among these methods are specifically described in the following.

The Interfacial Polymerization Method

Polycarbonate resin production by the interfacial polymerization method will be described first. In the interfacial polymerization method, a dihydroxy compound and a carbonate precursor (preferably phosgene) are reacted in the presence of an aqueous alkali solution and a reaction-inert organic solvent generally while holding the pH at 9 or above; this is followed by interfacial polymerization in the presence of a polymerization catalyst to obtain the polycarbonate resin. As necessary, the reaction system may contain a molecular weight modifier (terminator) and may contain an oxidation inhibitor in order to inhibit oxidation of the dihydroxy compound.

The dihydroxy compound and the carbonate precursor are as has already been described above. The use of phosgene among the carbonate precursors is preferred, and this method is in particular known as the phosgene method when phosgene is used.

The reaction-inert organic solvent can be exemplified by chlorinated hydrocarbons such as dichloromethane, 1,2-dichloroethane, chloroform, monochlorobenzene, and dichlorobenzene, and by aromatic hydrocarbons such as benzene, toluene, and xylene. A single organic solvent may be used or any combination of two or more in any ratio may be used.

The alkali compound present in the aqueous alkali solution can be exemplified by alkaline-earth metal compounds and alkali metal compounds, e.g., sodium hydroxide, potassium hydroxide, lithium hydroxide, and sodium bicarbonate, whereamong sodium hydroxide and potassium hydroxide are preferred. A single alkali compound may be used or any combination of two or more in any ratio may be used.

There is no limitation on the concentration of the alkali compound in the aqueous alkali solution, but it is generally used at 5 to 10 mass % in order to control the pH in the aqueous alkali solution for the reaction to 10 to 12. In addition, for example, the molar ratio between the bisphenol compound and the alkali compound is preferably made generally 1:at least 1.9 and particularly 1:at least 2.0 and generally 1:not more than 3.2 and particularly 1:not more than 2.5, in order to control the pH of the aqueous phase to 10 to 12 and preferably 10 to 11 when the phosgene is injected.

The polymerization catalyst can be exemplified by aliphatic tertiary amines, e.g., trimethylamine, triethylamine, tributylamine, tripropylamine, and trihexylamine; alicyclic tertiary amines such as N,N'-dimethylcyclohexylamine and N,N'-diethylcyclohexylamine; aromatic tertiary amines such as N,N'-dimethylaniline and N,N'-diethylaniline; quaternary ammonium salts such as trimethylbenzylammonium chloride, tetramethylammonium chloride, and triethylbenzylammonium chloride; as well as pyridine, guanine, and guanidine salts. A single polymerization catalyst may be used or any combination of two or more in any ratio may be used.

The molecular weight modifier can be exemplified by monohydric aromatic phenols having a phenolic hydroxyl group; aliphatic alcohols such as methanol and butanol; mercaptans; and phthalimide, whereamong aromatic phenols are preferred. These aromatic phenols can be specifically exemplified by alkyl-substituted phenols such as m-methylphenol, p-methylphenol, m-propylphenol, p-propylphenol, p-tert-butylphenol, and p-(long-chain alkyl)-substituted phenols; vinyl group-containing phenols such as isopropenylphenol; epoxy group-containing phenols; and carboxyl group-containing phenols such as o-hydroxybenzoic acid and 2-methyl-6-hydroxyphenylacetic acid. A single molecular weight modifier may be used or any combination of two or more in any ratio may be used.

The amount of use of the molecular weight modifier, expressed per 100 moles of the dihydroxy compound, is generally at least 0.5 mole and preferably at least 1 mole and is generally not more than 50 moles and preferably not more than 30 moles. The thermal stability and hydrolysis resistance of the polycarbonate resin composition can be improved by having the amount of use of the molecular weight modifier be in the indicated range.

Any mixing sequence for the reactants, reaction medium, catalyst, additives, and so forth, may be used during the reaction insofar as the desired polycarbonate resin is obtained, and any appropriate sequence may be established. For example, when phosgene is used for the carbonate precursor, the molecular weight modifier may be mixed at any point from the reaction between the dihydroxy compound and phosgene (phosgenation) to the start of the polymerization reaction.

The reaction temperature is generally 0° C. to 40° C., while the reaction time is generally several minutes (for example, 10 minutes) to several hours (for example, 6 hours).

The Melt Transesterification Method

Polycarbonate resin production by the melt transesterification method will now be described.

As an example, a transesterification reaction between a carbonate diester and a dihydroxy compound may be carried out in the melt transesterification method.

The dihydroxy compound is as has already been described above.

The carbonate diester, on the other hand, can be exemplified by dialkyl carbonate compounds such as dimethyl carbonate, diethyl carbonate, and di-tert-butyl carbonate; diphenyl carbonate; and substituted diphenyl carbonates such as ditolyl carbonate. Among these, diphenyl carbonate and substituted diphenyl carbonates are preferred and diphenyl carbonate in particular is more preferred. A single carbonate diester may be used or any combination of two or more in any ratio may be used.

The ratio between the dihydroxy compound and the carbonate diester may be freely selected insofar as the desired polycarbonate resin is obtained, but, expressed per 1 mole of the dihydroxy compound, the use of the carbonate diester in at least an equimolar amount is preferred and the use of at least 1.01 moles of the carbonate diester is more preferred. The upper limit is generally less than or equal to 1.30 moles. The amount of the terminal hydroxyl group can be adjusted into a favorable range by obeying the indicated range.

With polycarbonate resins, the amount of terminal hydroxyl group tends to exercise a substantial influence on the thermal stability, hydrolytic stability, color, and so forth. As a consequence, the amount of terminal hydroxyl group may be adjusted as necessary by any known method. In the case of the transesterification reaction, a polycarbonate resin having an adjusted amount of terminal hydroxyl group can be obtained generally by adjusting, for example, the mixing ratio between the carbonate diester and aromatic dihydroxy compound and the extent of pressure reduction during the transesterification reaction. These procedures generally make it possible to also adjust the molecular weight of the resulting polycarbonate resin.

With reference to adjusting the amount of terminal hydroxyl group by adjusting the mixing ratio between the carbonate diester and dihydroxy compound, this mixing ratio is as has already been described above.

A more active method for carrying out adjustment can be exemplified by the separate admixture of a terminator when the reaction is carried out. This terminator can be exemplified by monohydric phenols, monovalent carboxylic acids, and carbonate diesters. A single terminator may be used or any combination of two or more in any ratio may be used.

A transesterification catalyst is generally used in the production of polycarbonate resins by the melt transesterification method. Any transesterification catalyst may be used. Within this sphere, for example, the use of an alkali metal compound and/or an alkaline-earth metal compound is preferred. In addition, a basic compound, for example, a basic boron compound, a basic phosphorus compound, a basic ammonium compound, or an amine compound, may be co-used on an auxiliary basis. A single transesterification catalyst may be used or any combination of two or more in any ratio may be used.

The reaction temperature in the melt transesterification method is generally 100° C. to 320° C. A reduced pressure condition of 2 mmHg or less is generally used for the pressure during the reaction. With regard to the specific operation, a melt polycondensation reaction may be carried out while removing by-products, e.g., an aromatic hydroxy compound and so forth, using the indicated conditions.

The melt condensation reaction may be executed as a batch or continuous regime. In the case of a batch regime, any mixing sequence for the reactants, reaction medium, catalyst, additives, and so forth, may be used insofar as the desired polycarbonate resin is obtained, and any appropriate sequence may be established. However, the melt polycondensation reaction is preferably implemented as a continuous regime based on a consideration of the stability of the polycarbonate resin and the polycarbonate resin composition.

The melt transesterification method may as necessary use a catalyst deactivator. Any compound that neutralizes the transesterification catalyst may be used as the catalyst deactivator. Examples here are sulfur-containing acidic compounds and their derivatives. A single catalyst deactivator may be used or any combination of two or more in any ratio may be used.

The amount of use of the catalyst deactivator is generally at least 0.5 equivalent and preferably at least 1 equivalent and generally not more than 10 equivalents and preferably not more than 5 equivalents, expressed with respect to the alkali metal or alkaline-earth metal present in the transesterification catalyst. Expressed with respect to the polycarbonate resin, it is generally at least 1 ppm and generally not more than 100 ppm and preferably not more than 20 ppm.

Other Features of the Polycarbonate Resin

The molecular weight of the polycarbonate resin is not particularly limited and may be selected as appropriate; however, the viscosity-average molecular weight [Mv] obtained from the solution viscosity is generally at least 10,000, preferably at least 16,000, and more preferably at least 17,000 and is generally not more than 40,000, preferably not more than 30,000, and more preferably not more than 24,000. The mechanical strength of the polycarbonate resin composition of the present invention can be further improved by having the viscosity-average molecular weight be at least the indicated lower limit value, and this is thus more preferred in those instances of use in applications where there is a strong requirement for mechanical strength. On the other hand, by having the viscosity-average molecular weight be not more than the indicated upper limit value, improvement can be had through an inhibition of the reduction in the flowability of the polycarbonate resin composition of the present invention and molding operations can then be conveniently performed due to an increase in the molding processability. A mixture of two or more polycarbonate resins having different viscosity-average molecular weights may be used, in which case a polycarbonate resin may be admixed that has a viscosity-average molecular weight outside the preferred range indicated above.

The viscosity-average molecular weight [Mv] denotes the value determined from Schnell's viscosity equation $\eta = 1.23 \times 10^{-4} \, Mv^{0.83}$ where the intrinsic viscosity [η](unit: dL/g) is determined at a temperature of 20° C. using a Ubbelohde viscometer and methylene chloride as the solvent. The intrinsic viscosity [η] is the value calculated from the following equation using the specific viscosity [$\eta_{sp}$] measured at individual solution concentrations [C] (g/dL).

$$\eta = \lim_{c \to 0} \eta_{sp}/c \quad [\text{Math. 1}]$$

The terminal hydroxyl group concentration of the polycarbonate resin is not particularly limited and may be selected as appropriate; however, it is generally not more than 1000 ppm, preferably not more than 800 ppm, and more preferably not more than 600 ppm. This serves to bring about additional improvements in the residence heat stability and color of the polycarbonate resin composition of the present invention. In particular for a polycarbonate resin produced by the melt transesterification method, the lower limit on this terminal hydroxyl group concentration is generally at least 10 ppm and is preferably at least 30 ppm and more preferably at least 40 ppm. This serves to inhibit a reduction in the molecular weight and can bring about additional improvements in the mechanical properties of the polycarbonate resin composition of the present invention.

Here, the unit for the terminal hydroxyl group concentration is the mass of the terminal hydroxyl groups relative to the mass of the polycarbonate resin, as expressed in ppm. It is measured by colorimetry based on the titanium tetrachloride/acetic acid method (method described in Macromol. Chem., 88, 215 (1965)).

The polycarbonate resin may be used in the form of polycarbonate resin alone (here, "polycarbonate resin alone" is not limited to an embodiment in which only one species of polycarbonate resin is incorporated, and is used in the sense of including embodiments in which a plurality of polycarbonate resin species, for example, having different monomer compositions or molecular weights from each other, are incorporated), or may be used in a combination as an alloy (mixture) of polycarbonate resin and another thermoplastic resin. In addition, the polycarbonate resin may be structured as a copolymer composed mainly of polycarbonate resin, e.g., a copolymer of polycarbonate resin with an oligomer or polymer having a siloxane structure, in order to further improve the flame retardancy and impact resistance; a copolymer of polycarbonate resin with a phosphorus atom-bearing monomer, oligomer, or polymer, in order to further improve the thermal oxidation stability and flame retardancy; a copolymer of polycarbonate resin with a monomer, oligomer, or polymer having a dihydroxyanthraquinone structure, in order to improve the thermal oxidation stability; a copolymer of polycarbonate resin with an oligomer or polymer that has an olefinic structure, e.g., polystyrene, in order to improve the optical properties; and a copolymer of polycarbonate resin with a polyester resin oligomer or polymer in order to improve the chemical resistance.

The polycarbonate resin may also contain a polycarbonate oligomer in order to improve the flowability and improve the appearance of the molding. The viscosity-average molecular weight [Mv] of this polycarbonate oligomer is generally at least 1500 and is preferably at least 2000 and is generally not more than 9500 and preferably not more than 9000. The polycarbonate oligomer content is preferably not more than 30 mass % of the polycarbonate resin (including the polycarbonate oligomer).

The polycarbonate resin may be not only the virgin material, but may also be a polycarbonate resin regenerated from used products (so-called material-recycled polycarbonate resin). The used products here can be exemplified by optical recording media such as optical disks; transparent vehicle components such as automotive window glass, automotive headlamp lenses, and windshields; containers such as water bottles; eyeglass lenses; and architectural elements such as soundproofing walls, glazing, and corrugated sheet. Also usable are nonconforming products; pulverized material obtained from, e.g., sprues and runners; and pellets obtained by melting the preceding.

Regenerated polycarbonate resin is preferably not more than 80 mass % and more preferably not more than 50 mass % of the polycarbonate resin present in the polycarbonate resin composition of the present invention. Since there is a strong possibility that the regenerated polycarbonate resin will have undergone deterioration, e.g., thermal deterioration, aging, and so forth, the use of such a polycarbonate resin in excess of the indicated range holds the possibility of causing a reduction in hue and mechanical properties.

[The Filler (B)]

The filler (B) in the present invention is a filler selected from glass fillers and carbon fibers, and its content is 40 to 95 mass % polycarbonate resin (A) and 5 to 60 mass % filler (B). At these proportions, the rigidity and impact resistance of the polycarbonate resin composition of the present invention can be effectively raised by the presence of the filler.

Preferred glass fillers can be exemplified by glass fiber, flat cross-section glass fiber, glass flake, milled glass fiber, and glass beads.

These are described herebelow.

[The Glass Fiber]

Any known glass fiber can be used as the glass fiber, regardless of the form of the glass fiber when incorporated, e.g., A glass, E glass, zirconia component-containing alkali-resistant glass compositions, chopped strand, roving glass, and (long-fiber) masterbatches of glass fiber and a thermoplastic resin. Among the preceding, the glass fiber used in the present invention is preferably non-alkali glass (E glass) in order to improve the thermal stability of the polycarbonate resin composition of the present invention.

The number-average fiber length of the glass fiber is preferably from at least 1 mm to not more than 10 mm and is more preferably from 1.5 to 6 mm and even more preferably is 2 to 5 mm.

When the number-average fiber length exceeds 10 mm, the glass fiber is prone to shed from the molding surface and a reduction in productivity will readily occur. When the number-average fiber length is less than 1 mm, the improvement in the mechanical strength will tend to be inadequate due to the small aspect ratio for the glass fiber.

This number-average fiber length is the value determined by treating a molding by, for example, high-temperature ashing, dissolution with a solvent, or chemical degradation and recovering the filler residue; observing 2000 glass fibers from this filler residue with an optical microscope; and determining the number-average fiber length from the images using an image analyzer. This value is calculated using a method that does not count fiber with a length at or below a benchmark fiber diameter.

The diameter of the glass fiber is preferably 3 to 20 µm. This can be produced by pulverizing a glass fiber strand using any heretofore known method and specifically, for example, with a hammer mill or ball mill. The improvement in the mechanical strength is again inadequate when the glass fiber diameter is less than 3 µm, while the appearance readily declines at above 20 µm. The glass fiber diameter is more preferably 5 to 15 µm and is even more preferably 6 to 14 µm.

The glass fiber used in the present invention can be subjected to a surface treatment with, e.g., a silane coupling agent such as an aminosilane or epoxysilane, in order to improve the adhesion with the polycarbonate resin.

In addition, the glass fiber used in the present invention is generally preferably used in the form of a chopped strand (chopped glass fiber) as obtained by cutting a bundle or gathering of a large number of these fibers to a prescribed length, and when this is done a sizing agent is preferably applied to the glass fiber used by the present invention. In addition to providing the advantage of raising the production stability for the polycarbonate resin of the present invention, the application of a sizing agent makes it possible to obtain excellent mechanical properties.

There are no particular limitations on the sizing agent, and it can be exemplified by urethane, epoxy, and acrylic sizing agents. The sizing agent for the glass fiber used in the present invention is more preferably a urethane or epoxy sizing agent and is even more preferably an epoxy sizing agent.

The cut length of the chopped strand (chopped glass fiber) is also not particularly limited, but is generally 1 to 10 mm and is preferably 1.5 to 6 mm and more preferably 2 to 5 mm.

The glass fiber used in the present invention has a fiber cross section that is substantially a true circle, and specifically may be a glass fiber having an approximately circular cross section with a flattening ratio (major diameter/minor diameter) for the fiber cross section of from at least 1 to less than 1.5. This flattening ratio is preferably from 1 to 1.4, more preferably 1 to 1.2, and particularly preferably 1 to 1.1.

This flattening ratio value is the average value determined by treating a molding by, for example, high-temperature ashing, dissolution with a solvent, or chemical degradation and recovering the filler residue; observing 2000 glass fibers from this filler residue with an optical microscope; and determining the flattening ratio value from the images using an image analyzer.

[The Flat Cross-section Glass Fiber]

The flat cross-section glass fiber used by the present invention is preferably a flat cross-section glass fiber having an average value for the major diameter of the fiber cross section of 10 to 50 µm and having an average value for the ratio between the major diameter and minor diameter (major diameter/minor diameter) of from at least 1.5 to not more than 8. The use of such a glass fiber can effectively increase the flowability, rigidity, impact resistance, and warping resistance of the polycarbonate resin composition of the present invention.

The average value of the major diameter of the fiber cross section of the flat cross-section glass is generally 10 to 50 µm and is preferably 15 to 40 µm, more preferably 20 to 35 µm, and even more preferably 25 to 30 µm.

The average value of the ratio between the major diameter and minor diameter (major diameter/minor diameter) of the flat cross-section glass is generally 1.5 to 8 and is preferably 2 to 7, more preferably 2.5 to 6, and even more preferably 3 to 5. The flowability, warping resistance, and impact resistance of the polycarbonate resin of the present invention can be increased by the use of a flat cross-section glass fiber having an average value for the major diameter-to-minor diameter ratio (major diameter/minor diameter) in the indicated range.

The cross-sectional shape of the flat cross-section glass fiber used in the present invention encompasses not only flat cross sections, but also elliptical shapes, cocoon shapes, trefoil shapes, and noncircular shapes that resemble these. The flat shape is preferred among the preceding from the standpoint of the mechanical strength, warping resistance, and anisotropy.

The ratio of the average fiber length to the average fiber diameter of the flat cross-section glass fiber (the aspect ratio) is generally 2 to 120 and is preferably 2.5 to 70 and more preferably 3 to 50. The mechanical strength assumes a declining trend when the ratio of the average fiber length to the average fiber diameter of the flat cross-section glass fiber (the aspect ratio) is less than 2, while a large warpage and anisotropy occur and the appearance of the molding assumes a trend of substantial deterioration when this ratio exceeds 120.

The average fiber diameter of this flat cross-section glass fiber is the number-average fiber diameter with the flat cross-sectional shape being converted to a true circle with the same area. The average fiber length denotes the number-average fiber length in the polycarbonate resin composition of the present invention. This number-average fiber length is the value determined by treating a molding by, for example, high-temperature ashing, dissolution with a solvent, or chemical degradation and recovering the filler residue; observing this filler residue with an optical microscope; and determining the number-average fiber length from the images using an image analyzer. This value is calculated using a method that does not count fiber with a length at or below a benchmark fiber diameter.

With regard to the glass composition of the flat cross-section glass fiber, various glass compositions, as typified by A glass, C glass, E glass, and so forth, can be used and there is no particular limitation thereon. The glass fiber may contain components such as $TiO_2$, $SO_3$, $P_2O_5$, CaO, MgO, $B_2O_3$, and so forth on an optional basis. E glass (non-alkali glass) is preferred among the preceding because this raises the mechanical strength and thermal stability of the polycarbonate resin composition of the present invention.

With the goal of improving the adhesiveness with the polycarbonate resin, the flat cross-section glass fiber used in the present invention may be subjected to a surface treatment using, for example, a titanate coupling agent, an aluminate coupling agent, or a silane coupling agent such as an aminosilane or an epoxy silane.

In addition, the flat cross-section glass fiber used in the present invention is generally preferably used in the form of a chopped strand (chopped glass fiber) as obtained by cutting a bundle or gathering of a large number of these fibers to a prescribed length, and when this is done a sizing agent is preferably applied to the flat cross-section glass fiber used by the present invention. In addition to providing the advantage of raising the production stability for the polycarbonate resin composition of the present invention, the application of a sizing agent makes it possible to obtain excellent mechanical properties.

There are no particular limitations on the sizing agent, and it can be exemplified by urethane, epoxy, acrylic, polyester, styrenic, and olefin sizing agents. Urethane and epoxy sizing agents are more preferred among the preceding and epoxy sizing agents are even more preferred.

The amount of sizing agent application is generally 0.1 to 3 mass % and preferably 0.2 to 1 mass % where the flat cross-section glass fiber is 100 mass %.

Regardless of the form of the flat cross-section glass fiber when incorporated, e.g., chopped strand, roving glass, a (long-fiber) masterbatch of a flat cross-section glass fiber and a thermoplastic resin, and so forth, a flat cross-section glass fiber of any known form can be used for the flat cross-section glass fiber used by the present invention; however, chopped strand (chopped glass fiber) is preferred for the present invention from a productivity standpoint.

The cut length of the chopped strand (chopped glass fiber) is also not particularly limited, but is generally 1 to 10 mm and is preferably 1.5 to 6 mm and more preferably 2 to 5 mm.

[The Glass Flake]

The glass flake used by the present invention is glass flake having an average thickness of preferably 0.2 to 10 μm, more preferably 0.3 to 7 μm, and even more preferably 0.5 to 6 μm. The impact resistance and flame retardancy of the polycarbonate resin composition of the present invention readily decline when the average thickness exceeds the upper limit on the indicated range, which is thus disfavored. The glass flake is extremely susceptible to cracking and the rigidity and warping resistance assume a declining trend when the average thickness falls below the lower limit on the indicated range, which is thus again disfavored.

The average thickness of the glass flake here is the value measured by the following method. Thus, the thickness of at least 100 glass flakes is measured using a scanning electron microscope (SEM) and the measured values are averaged. The glass flake itself may be observed with the scanning electron microscope, or the glass flake may be filled into a resin followed by molding, fracture thereof, and measurement by observation of the fracture cross section. In both of these measurement methods, the sample platform of the scanning electron microscope must be adjusted using the sample platform microadjustment mechanism to bring the glass flake cross section (thickness direction) orthogonal to the axis of the irradiating electron beam in the scanning electron microscope.

The average particle size of the glass flake is preferably 10 to 1000 μm, more preferably 20 to 700 μm, and even more preferably 50 to 200 μm. This average particle size is determined as the median size in the weight-average distribution as determined by a standard sieving method.

Viewed from the standpoint of improving the mechanical strength, the glass flake is preferably glass flake on which a surface treatment with a known surface-treatment agent, e.g., a silane coupling agent, methylhydrogensiloxane, titanate coupling agent, or aluminate coupling agent, has been executed. Glass flake that has been granulated or aggregated using a binder, e.g., an acrylic resin, urethane resin, epoxy resin, or unsaturated polyester resin, is more preferred from a handling standpoint. However, the average particle size range and the thickness range indicated above for the glass flake do not apply to the granulate or aggregate afforded by granulation or aggregation. The glass composition of the glass flake is not particularly limited, and a suitable selection from various glass compositions, as typified by A glass, C glass, and E glass, can be used.

[The Milled Glass Fiber]

The milled glass fiber used in the present invention refers to a milled fiber from a glass fiber and is a glass short fiber. More particularly, this milled glass fiber is obtained by bundling or gathering from several tens of glass single fibers (filaments) to several thousand glass single fibers (filaments) into a glass fiber strand, cutting this glass fiber strand to a prescribed length to yield a glass fiber chopped strand, and milling this glass fiber chopped strand. At this time, the glass fiber chopped strand is preferably subjected to a surface treatment with a sizing agent as described above.

The milled glass fiber is preferably a short fiber that has a ratio of the average fiber length to the average fiber diameter (the aspect ratio) of not more than 10. The aspect ratio of the milled glass fiber is preferably not more than 8 and more preferably not more than 7 and is preferably at least 2.5 and is more preferably at least 3. A large warping and anisotropy occur and the appearance of the molding assumes a deteriorating trend when the aspect ratio exceeds 10.

The average fiber diameter of the milled glass fiber is preferably 1 to 25 μm and more preferably 5 to 17 μm, and the average length of the milled glass fiber is preferably 1 to 500 μm, more preferably 10 to 300 μm, and even more preferably 20 to 200 μm. An impaired molding processability is prone to occur with a milled glass fiber from a short fiber with an average fiber diameter of less than 1 μm, while an impaired appearance is prone to occur and the reinforcing effect tends to be inadequate when the average fiber diameter is greater than 25 μm.

The average fiber diameter of the milled glass fiber denotes the number-average fiber diameter, while the average fiber length denotes the number-average fiber length in the polycarbonate resin composition of the present invention.

The milled glass fiber may have a glass composition such as A glass, C glass, E glass, and so forth, whereamong E glass (non-alkali glass) is preferred from the standpoint of not having a negative influence on the polycarbonate resin.

[The Glass Beads]

The glass beads used in the present invention preferably have an average particle diameter of 10 to 30 μm. An impaired molding processability is prone to occur for the polycarbonate resin composition when the average particle diameter is less than 10 μm; when it exceeds 30 μm, an impaired surface appearance on the part of the molding is prone to occur and an inadequate scratching resistance will also be prone to occur.

The glass composition of the glass beads includes glass compositions such as A glass, C glass, E glass, and so forth, with E glass, which is non-alkali glass, being preferred in particular because it does not exercise a negative influence on polycarbonate resins.

Insofar as the properties of the polycarbonate resin composition of the present invention are not impaired, the glass beads may be subjected to a surface treatment, for example, with a silane compound or epoxy compound, in order to improve the affinity with the polycarbonate resin.

The glass beads used in the present invention may be hollow glass beads (glass balloons). The use of such hollow glass beads can provide weight reduction and a heat-insulating effect.

[The Carbon Fiber]

The carbon fiber used by the present invention can generally be exemplified by carbon fiber produced by firing a starting material such as acrylic fiber, petroleum-based or coal-based pitch, cellulosic fiber, lignin, and so forth, and may be of various types such as flameproofed, carbonaceous, or graphitic. Pitch-based carbon fiber starting from pitch and PAN-based carbon fiber starting from acrylic fiber (PAN fiber) are preferred.

The number-average fiber length of the carbon fiber is preferably 1 to 10 mm, and the diameter of the carbon fiber is preferably 5 to 20 µm. Shedding of the carbon fiber from the molding surface and a decline in the productivity are prone to occur when the number-average fiber length exceeds 10 mm. When the number-average fiber length is less than 1 mm, the improvement in the mechanical strength will tend to be inadequate due to the small aspect ratio of the carbon fiber.

This number-average fiber length is the value determined by treating a molding by, for example, high-temperature ashing, dissolution with a solvent, or chemical degradation and recovering the filler residue; observing 2000 carbon fibers from this filler residue with an optical microscope; and determining the number-average fiber length from the images using an image analyzer. This value is calculated using a method that does not count fiber with a length at or below a benchmark fiber diameter.

The improvement in the mechanical strength is likewise also inadequate when the carbon fiber diameter is less than 5 µm, while a reduction in appearance is prone to occur at above 20 µm. The carbon fiber diameter is more preferably 6 to 15 µm.

With the goal of improving the adhesiveness with the polycarbonate resin, the surface of the carbon fiber may be subjected to a surface treatment with, for example, a silane coupling agent such as an aminosilane or epoxysilane.

In addition, the carbon fiber used in the present invention is generally preferably used in the form of a chopped strand (chopped carbon fiber) as obtained by cutting a bundle or gathering of a large number of these fibers to a prescribed length, and when this is done a sizing agent is preferably applied to the carbon fiber used by the present invention. In addition to providing the advantage of raising the production stability for the polycarbonate resin of the present invention, the application of a sizing agent makes it possible to obtain excellent mechanical properties.

There are no particular limitations on the sizing agent, and it can be exemplified by urethane, epoxy, and acrylic sizing agents. The sizing agent for the carbon fiber used in the present invention is more preferably a urethane or epoxy sizing agent and is even more preferably an epoxy sizing agent.

The cut length of the chopped strand (chopped carbon fiber) is also not particularly limited, but is generally 1 to 20 mm and is preferably 2 to 10 mm and more preferably 3 to 8 mm.

[The Content of the Filler (B)]

The contents of the polycarbonate resin (A) and the filler (B) in the present invention are 40 to 95 mass % for component (A) and 5 to 60 mass % for component (B). 50 to 90 mass % for component (A) and 10 to 50 mass % for component (B) are preferred, and 60 to 85 mass % for component (A) and 15 to 40 mass % for component (B) are even more preferred. An excellent rigidity, heat resistance, impact resistance, and flame retardancy can be maintained for the polycarbonate resin composition of the present invention by obeying this range.

When a glass filler is used as the filler (B), the use is then also preferred of combinations of the previously described glass fiber, flat cross-section glass fiber, glass flake, milled glass fiber, and glass beads.

When glass fiber and glass flake are used, they are incorporated, as the glass fiber/glass flake mass ratio, preferably at 5/95 to 95/5, more preferably 10/90 to 90/10, even more preferably 15/85 to 85/15, and particularly preferably 20/80 to 80/20. An excellent balance among mechanical properties, e.g., rigidity, warping resistance, impact resistance, and so forth, can be established for the polycarbonate resin composition of the present invention by using the indicated range.

When a flat cross-section glass fiber and glass flake are used, they are incorporated, as the flat cross-section glass fiber/glass flake mass ratio, preferably at 5/95 to 95/5, more preferably 10/90 to 90/10, even more preferably 15/85 to 85/15, and particularly preferably 20/80 to 80/20. An excellent balance among mechanical properties, e.g., rigidity, warping resistance, impact resistance, and so forth, can be established for the polycarbonate resin composition of the present invention by the combined use of these two in the indicated range.

The co-use of the glass fiber and carbon fiber for the filler (B) is also preferred. In this case, the glass filler and carbon fiber are incorporated, as the glass filler/carbon fiber mass ratio, preferably at 5/95 to 95/5, more preferably 10/90 to 90/10, even more preferably 20/80 to 80/20, and particularly preferably 30/70 to 70/30.

When the flat cross-section glass fiber is used as the glass filler and is used in combination with carbon fiber, they are incorporated, as the flat cross-section glass fiber/carbon fiber mass ratio, preferably at 5/95 to 95/5, more preferably 10/90 to 90/10, even more preferably 20/80 to 80/20, and particularly preferably 30/70 to 70/30.

[The Phosphazene Compound (C)]

The phosphazene compound (C) used in the present invention is an organic compound that has the —P=N— bond in the molecule and is preferably at least one compound selected from the group consisting of cyclic phosphazene compounds represented by the following general formula (1), chain phosphazene compounds represented by the following general formula (2), and crosslinked phosphazene compounds obtained by crosslinking, through a crosslinking group, at least one phosphazene compound selected from the group consisting of the following general formula (1) and general formula (2).

[C2]

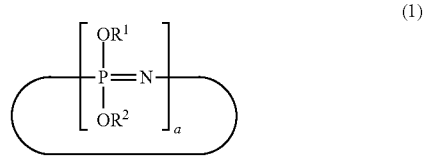

(1)

In formula (1), a is an integer from 3 to 25 and $R^1$ and $R^2$ each independently represent an alkyl group, cycloalkyl group, alkenyl group, alkynyl group, aryloxy group, amino group, hydroxy group, aryl group, or alkylaryl group.

[C3]

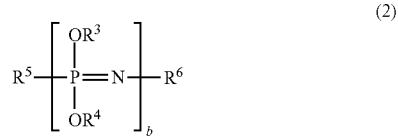

(2)

In formula (2), b is an integer from 3 to 10,000 and $R^3$ and $R^4$ each independently represent an alkyl group, cycloalkyl group, alkenyl group, alkynyl group, aryloxy group, amino group, hydroxy group, aryl group, or alkylaryl group.

$R^5$ represents at least one selection from the —N=P(OR$^3$)$_3$ group, —N=P(OR$^4$)$_3$ group, —N=P(O)OR$^3$ group, and —N=P(O)OR$^4$ group, and $R^6$ represents at least one selection from the —P(OR$^3$)$_4$ group, —P(OR$^4$)$_4$ group, —P(O) (OR$^3$)$_2$ group, and —P(O) (OR$^4$)$_2$ group.

The alkyl group here can be exemplified by the methyl group, ethyl group, propyl group, isopropyl group, butyl group, t-butyl group, pentyl group, hexyl group, octyl group, decyl group, and dodecyl group, and is preferably an alkyl group having from 1 to 6 carbons, e.g., the methyl group, ethyl group, propyl group, isopropyl group, butyl group, t-butyl group, pentyl group, and hexyl group, and particularly preferably is an alkyl group having from 1 to 4 carbons, e.g., the methyl group, ethyl group, propyl group, and so forth.

The cycloalkyl group can be exemplified by cycloalkyl groups that have from 5 to 14 carbons, e.g., the cyclopentyl group, cyclohexyl group, and so forth, whereamong cycloalkyl groups having from 5 to 8 carbons are preferred.

The alkenyl group can be exemplified by alkenyl groups that have from 2 to 8 carbons, e.g., the vinyl group, allyl group, and so forth, while the cycloalkenyl group can be exemplified by cycloalkenyl groups that have from 5 to 12 carbons, e.g., the cyclopentenyl group, cyclohexenyl group, and so forth.

The alkynyl group can be exemplified by alkynyl groups that have from 2 to 8 carbons, e.g., the ethynyl group, propynyl group, and so forth, and by aryl such as the ethynylbenzene group.

The aryl group can be exemplified by aryl groups that have from 6 to 20 carbons, e.g., the phenyl group, methylphenyl (i.e., tolyl) group, dimethylphenyl (i.e., xylyl) group, trimethylphenyl group, naphthyl group, and so forth, whereamong aryl groups having from 6 to 10 carbons are preferred and the phenyl group is particularly preferred.

The alkylaryl group can be exemplified by aralkyl groups that have 6 to 20 carbons, e.g., the benzyl group, phenethyl group, phenylpropyl group, and so forth, whereamong aralkyl groups having 7 to 10 carbons are preferred and the benzyl group is particularly preferred.

The $R^1$ and $R^2$ in general formula (1) and the $R^3$ and $R^4$ in general formula (2) are preferably an aryl group or arylalkyl group. The thermal stability of the polycarbonate resin composition of the present invention can be effectively raised by using such an aromatic phosphazene. Viewed from this perspective, $R^1$, $R^2$, $R^3$ and $R^4$ are more preferably an aryl group and particularly preferably are the phenyl group.

The cyclic and/or chain phosphazene compounds represented by general formulas (1) and (2) can be exemplified by phenoxyphosphazene; (poly)tolyloxyphosphazenes such as o-tolyloxyphosphazene, m-tolyloxyphosphazene, and p-tolyloxyphosphazene; (poly)xylyloxyphosphazenes such as o,m-xylyloxyphosphazene, o,p-xylyloxyphosphazene, and m,p-xylyloxyphosphazene; o,m,p-trimethylphenyloxyphosphazene; (poly)phenoxytolyloxyphosphazenes such as phenoxy-o-tolyloxyphosphazene, phenoxy-m-tolyloxyphosphazene, and phenoxy-p-tolyloxyphosphazene; (poly)phenoxytolyloxyxylyloxyphosphazenes such as phenoxy-o,m-xylyloxyphosphazene, phenoxy-o,p-xylyloxyphosphazene, and phenoxy-m,p-xylyloxyphosphazene; and phenoxy-o,m,p-trimethylphenyloxyphosphazene, wherein cyclic and/or chain phenoxyphosphazenes are preferred.

The cyclic phosphazene compound represented by general formula (1) is particularly preferably a cyclic phenoxyphosphazene in which $R^1$ and $R^2$ are the phenyl group. Such cyclic phenoxyphosphazene compounds can be exemplified by compounds such as phenoxycyclotriphosphazene, octaphenoxycyclotetraphosphazene, and decaphenoxycyclopentaphosphazene, as obtained, for example, by preparing a mixture of cyclic and straight-chain chlorophosphazenes by reacting ammonium chloride and phosphorus pentachloride at a temperature of 120° C. to 130° C.; recovering the cyclic chlorophosphazene, e.g., hexachlorocyclotriphosphazene, octachlorocyclotetraphosphazene, and decachlorocyclopentaphosphazene, from this mixture; and carrying out substitution by the phenoxy group. This cyclic phenoxyphosphazene compound is preferably a compound in which a in general formula (1) is an integer from 3 to 8 and may be a mixture of compounds that have different values for a.

The average value of this a is preferably 3 to 5 and more preferably 3 to 4. Here, a mixture of compounds is preferred in which the compound with a=3 is at least 50 mass %, the compound with a=4 is 10 to 40 mass %, and the compounds in which a is 5 or more are a total of not more than 30 mass %.

Chain phenoxyphosphazenes in which $R^3$ and $R^4$ are the phenyl group are particularly preferred for the chain phosphazene compounds represented by general formula (2). These chain phenoxyphosphazene compounds can be exemplified by the compounds obtained by carrying out a ring-opening polymerization at a temperature of 220° C. to 250° C. on the hexachlorocyclotriphosphazene obtained by the previously described method and carrying out substitution with the phenoxy group on the resulting straight-chain dichlorophosphazene having a degree of polymerization of 3 to 10,000. The b in general formula (2) for this straight-chain phenoxyphosphazene compound is preferably 3 to 1000, more preferably 3 to 100, and even more preferably 3 to 25.

The crosslinked phosphazene compound can be exemplified by compounds that have a 4,4'-diphenylene group crosslinking structure, e.g., compounds that have a 4,4'-sulfonyldiphenylene (bisphenol S residue) crosslinking structure, compounds that have a 2,2-(4,4'-diphenylene)isopropylidene group crosslinking structure, compounds that have a 4,4'-oxydiphenylene group crosslinking structure, and compounds that have a 4,4'-thiodiphenylene group crosslinking structure.

Viewed in terms of the flame retardancy, the crosslinked phosphazene compound is preferably a crosslinked phenoxyphosphazene compound as obtained by the crosslinking, through a crosslinking group as described above, of a cyclic phenoxyphosphazene compound in which $R^1$ and $R^2$ in general formula (1) are the phenyl group, or is preferably a crosslinked phenoxyphosphazene compound as obtained by the crosslinking, through a crosslinking group as described above, of a chain phenoxyphosphazene compound in which $R^3$ and $R^4$ in general formula (2) are the phenyl group. A crosslinked phenoxyphosphazene compound as obtained by the crosslinking, through a crosslinking group as described above, of a cyclic phenoxyphosphazene compound is more preferred.

The phenylene group content in the crosslinked phenoxyphosphazene compound, expressed with reference to the total number of phenylene and phenyl groups in the cyclic phosphazene compound with general formula (1) and/or the chain phenoxyphosphazene compound with general formula (2), is generally 50 to 99.9% and preferably 70 to 90%. This crosslinked phenoxyphosphazene compound is particularly preferably a compound that does not contain a free hydroxyl group in its molecule.

Viewed in terms of the flame retardancy and mechanical properties, the phosphazene compound (C) in the present invention is preferably at least one compound selected from the group consisting of cyclic phenoxyphosphazene compounds with general formula (1) and crosslinked phenoxyphosphazene compounds as obtained by the crosslinking through a crosslinking group of a cyclic phenoxyphosphazene compound with general formula (1).

The content of this phosphazene compound (C), expressed per 100 mass parts of the total of the polycarbonate resin (A) and the filler (B), is 3 to 30 mass parts, preferably 4 to 20 mass parts, and more preferably 5 to 15 mass parts. A satisfactory improvement in the flame retardancy and flowability can be brought about by using at least 3 mass parts, while an excellent mechanical strength can be maintained by using not more than 30 mass parts.

[The Granular Phosphazene]

This phosphazene compound (C) undergoes consolidation or solidification upon exposure to compression or shear, and as a consequence, when it is blended into a polycarbonate resin by melt-mixing, the blend sticks or seizes and handling at an industrial level is thus quite problematic. A flame retardant masterbatch has been proposed in which a phosphazene compound is blended with a polyester resin, a polycarbonate resin, and a polyester elastomer (Japanese Patent Application Laid-open No. 2006-307178), and a flame retardant masterbatch formed of a phosphazene compound and a phenolic resin has also been proposed (Japanese Patent Application Laid-open No. 2008-101035).

However, when such a flame retardant masterbatch is blended into a thermoplastic resin, the polyester elastomer and polyester resin, e.g., polyethylene terephthalate resin, or the phenolic resin component present in the flame retardant masterbatch cause a reduction in the flame retardancy. In addition, since masterbatching by melt-mixing with a polycarbonate resin imposes a substantial thermal history, the problem also arises that polycarbonate resin compositions that use a masterbatch undergo discoloration as a consequence.

It was discovered that the use as the phosphazene compound (C) of a granular phosphazene compound that has a percentage retained on a sieve with an aperture of 400 μm of at least 55 mass % and a bulk density of 0.3 to 1.5 g/mL, provides an excellent productivity and also an excellent processability when melt-mixed with a polycarbonate resin.

The following aspects [1] to [5] are provided as embodiments in relation to such a granular phosphazene compound.

[1] A granular phosphazene compound that has a percentage retained on a sieve with an aperture of 400 μm of at least 55 mass % and that has a bulk density of 0.3 to 1.5 g/mL.

[2] The granular phosphazene compound according to [1], wherein the phosphazene compound is an aromatic phosphazene compound.

[3] The granular phosphazene compound according to [1] or [2], that is a flame retardant for polycarbonate resins.

[4] A polycarbonate resin composition comprising a polycarbonate resin and a granular phosphazene compound according to any of [1] to [3].

[5] A method of producing a polycarbonate resin composition comprising melt-mixing a polycarbonate resin and a granular phosphazene compound according to any of [1] to [3] using an extruder.

The granulometry of this granular phosphazene compound is characterized by a percentage retained on a sieve with an aperture of 400 μm of at least 55 mass %.

Phosphazene compounds are finely granular at normal temperature and undergo solidification upon exposure to compression or shear, and thus when melt-mixed in this finely granular form with a thermoplastic resin using an extruder, problems readily occur such as sticking by the phosphazene compound to the extruder screw. By having the indicated granulometry, this granular phosphazene compound suppresses the occurrence of problems such as sticking to the extruder screw.

The percentage retained on a sieve with an aperture of 400 μm is preferably at least 60 mass %, more preferably at least 65 weight %, and even more preferably at least 70 mass %, while its upper limit is preferably not more than 99 mass % and more preferably not more than 98 mass %.

The percentage retained on a mesh sieve is determined in accordance with JIS Z 8801 as the percentage (mass %) remaining on the mesh after sieve classification by placing 100 g of the granular phosphazene compound sample on a sieve with an aperture of 400 μm (from Kansai Wire Netting Co., Ltd.) and shaking for 5 minutes using a sieve shaker (AS200 from Retsch).

This granular phosphazene compound is also characterized by having a bulk density of 0.3 to 1.5 g/mL. The feedability to the extruder is improved—and the occurrence of sticking to the extruder screw is also inhibited—by having the bulk density be in the indicated range. Viewed from this standpoint, the bulk density is preferably 0.4 to 1.3 g/mL and is more preferably 0.5 to 1.1 g/mL.

The bulk density here is the static bulk density value measured according to JIS K 7365 using a Multitester MT-1001 from Seishin Enterprise Co., Ltd.

Various methods can be used to adjust the bulk density and granulometry into the indicated ranges. For example, in one method, a commercially available phosphazene compound powder is compressed between opposing rolls, e.g., using a high-compression granulator, and the plates discharged from the discharge side are pulverized with a pulverizer; in another method, granulation is performed using, for example, an extrusion granulator, rolling granulator, stirred granulator (mixing-stirring granulator, high-speed mixing stirring granulator), fluidized granulator, centrifugal rolling granulator, centrifugal rolling fluidizing granulator, and so forth. Classification may as necessary also be performed after granulation by these methods.

It was also discovered that an excellent productivity and also an excellent processability during melt-mixing with polycarbonate resin is obtained by the use as the phosphazene compound (C) of a granular phosphazene having a bulk density of 0.4 to 1.5 g/mL and obtained by mixing (G) a polycarbonate resin particulate having a percentage passing a sieve with an aperture of 1000 μm of at least 30 mass %, into a phosphazene compound at an (C)/(G) mass ratio of 85/15 to 5/95.

By using such a composite with a bulk density of 0.4 to 1.5 g/mL and obtained by mixing, at the indicated mass ratio, with a polycarbonate resin particulate having a percentage passing a sieve with an aperture of 1000 μm of at least 30 mass %, the production of a flame-retardant polycarbonate resin composition can be carried out without the occurrence of problems such as powder solidification and sticking to the feeder or extruder during mixing with the polycarbonate resin or during melt-mixing with the polycarbonate resin using an extruder.

The following aspects [1] to [7] are provided as embodiments related to such a granular phosphazene.

[1] A granular phosphazene that has a bulk density of 0.4 to 1.5 g/mL and is obtained by mixing (G) a polycarbonate resin particulate having a percentage passing a sieve with an aperture of 1000 μm of at least 30 mass %, into a phosphazene compound (C) at a (C)/(G) mass ratio of 85/15 to 5/95.

[2] The granular phosphazene according to [1], wherein the polycarbonate resin particulate (G) has a percentage passing a sieve with an aperture of 500 μm of at least 50 mass %.

[3] The granular phosphazene according to [1] or [2], wherein the polycarbonate resin particulate (G) has a percentage passing a sieve with an aperture of 106 μm of at least 50 mass %.

[4] The granular phosphazene according to any of [1] to [3], wherein the percentage retained on a sieve with an aperture of 1680 μm is at least 50 mass %.

[5] The granular phosphazene according to any of [1] to [4], wherein the phosphazene compound (C) is an aromatic phosphazene compound.

[6] A polycarbonate resin composition comprising a polycarbonate resin and a granular phosphazene according to any of [1] to [5].

[7] A method of producing a polycarbonate resin composition comprising melt-mixing a polycarbonate resin and a granular phosphazene according to any of [1] to [5] using an extruder.

The percentage passing a sieve with an aperture of 1000 μm for the polycarbonate resin particulate (G) is more preferably at least 40 mass %, even more preferably at least 70 mass %, and most preferably at least 90 mass %.

The percentage passing a sieve with an aperture of 500 μm for the polycarbonate resin particulate (G) is preferably at least 50 mass %, more preferably at least 60 mass %, even more preferably at least 70 mass %, and most preferably at least 90 mass %.

In addition, the percentage passing a sieve with an aperture of 106 μm for the polycarbonate resin particulate (G) is preferably at least 50 mass %, more preferably at least 60 mass %, even more preferably at least 70 mass %, and most preferably at least 90 mass %.

The percentage passing a mesh sieve is measured in the present invention using an "RPS-85" Sieving Particle Size Analyzer from Seishin Enterprise Co., Ltd., under the following conditions: oscillation level=5, sifting time=3 minutes, and pulse interval=1 second.

The polycarbonate resin particulate (G) having the indicated sieving range can be obtained by adjusting the particulation conditions during production of this polycarbonate resin and/or by pulverizing and/or classifying the granular or pellet-form polycarbonate resin.

This granular phosphazene is obtained by mixing the phosphazene compound (C) and the polycarbonate resin particulate (G) at a (C)/(G) mass ratio of 85/15 to 5/95. Exceeding the indicated upper limit for the (C)/(G) mass ratio is unfavorable not only because production of the granular phosphazene then becomes quite problematic, but also because the resulting granular phosphazene compound exhibits severe stickiness and consolidation and problems then occur during production of the polycarbonate resin composition. Falling below the indicated lower limit for the (C)/(G) mass ratio is also unfavorable because this strongly impedes granulation and thus makes production of the granular phosphazene highly problematic.

Viewed from these standpoints, the (C)/(G) mass ratio is more preferably 80/20 to 20/80, even more preferably 78/22 to 40/60, and most preferably 75/25 to 50/50.

The bulk density of this granular phosphazene is 0.4 to 1.5 g/mL. A bulk density of less than 0.4 g/mL is unfavorable because the granule size then becomes excessively large, and as a consequence the dispersibility in the polycarbonate resin is degraded during mixing and melt-mixing with the polycarbonate resin, causing a decline in the flame retardancy and/or variability in the quality. Exceeding a bulk density of 1.5 g/mL is unfavorable because the granule size then becomes too small, which tends to cause stickiness and consolidation. Based on these considerations, the bulk density of the granular phosphazene is more preferably 0.45 to 0.8 g/mL, even more preferably 0.5 to 0.75 g/mL, and most preferably 0.55 to 0.7 g/mL.

The bulk density here is the static bulk density value measured according to JIS K 7365 using a Multitester MT-1001 from Seishin Enterprise Co., Ltd.

In addition, this granular phosphazene preferably has a granulometry whereby the percentage retained on a sieve with an aperture of 1680 μm is at least 50 mass %. The occurrence of problems such as sticking to the extruder screw is even more strongly suppressed by simultaneously satisfying the indicated granulometry and the indicated bulk density.

The percentage retained on a sieve with an aperture of 1680 μm is more preferably at least 60 mass %, even more preferably at least 70 mass %, and yet more preferably at least 80 mass %, while its upper limit is preferably not more than 99.8 mass % and more preferably not more than 99.5 mass %.

The percentage of the granular phosphazene retained on a mesh sieve is determined in accordance with JIS Z 8801 as the percentage (mass %) remaining on the mesh after sieve classification by placing 100 g of the granular phosphazene sample on a sieve with an aperture of 1680 μm (from Kansai Wire Netting Co., Ltd.) and shaking for 5 minutes using a sieve shaker (AS200 from Retsch).

[The Fluoropolymer (O)]

The polycarbonate resin composition of the present invention contains a fluoropolymer (D) at 0.001 to 1 mass parts per 100 mass parts of the total of the polycarbonate resin (A) and the filler (B). There are no limitations on the species of the fluoropolymer, and a single species of fluoropolymer may be used or any combination of two or more species in any ratio may be used.

The fluoropolymer can be exemplified by fluoroolefin resins. The fluoroolefin resins are generally polymers or copolymers that contain the fluoroethylene structure. Specific examples are difluoroethylene resins, tetrafluoroethylene resins, tetrafluoroethylene/hexafluoropropylene copolymer resins, and tetrafluoroethylene/perfluoroalkyl vinyl ether copolymer resins. Tetrafluoroethylene resins are preferred among the preceding. The fluoroethylene resin can be exemplified by fluoroethylene resins that have a fibril-forming capacity.

Fluoroethylene resins that have a fibril-forming capacity can be exemplified by "Teflon (registered trademark) 6J", "Teflon (registered trademark) 640J", and "Teflon (registered trademark) 6C" from Du Pont-Mitsui Fluorochemicals Co., Ltd., and "Polyflon F201L", "Polyflon F103", and "Polyflon FA500H" from Daikin Industries, Ltd. Commercially available water-based dispersions of fluoroethylene resins can be exemplified by "Teflon (registered trademark) 30J" and "Teflon (registered trademark) 31-JR" from Du Pont-Mitsui Fluorochemicals Co., Ltd., and "Fluon D-1" from Daikin Industries, Ltd.

Also usable are fluoroethylene polymers having a multilayer structure and obtained by the polymerization of vinylic monomer. Such fluoroethylene polymers can be exemplified by polystyrene-fluoroethylene composites, polystyrene-acrylonitrile-fluoroethylene composites, polymethyl methacrylate-fluoroethylene composites, and polybutyl methacrylate-fluoroethylene composites and can be specifically exemplified by "Metablen A-3800" from Mitsubishi Rayon Co., Ltd., and "Blendex 449" from the Chemtura Corporation.

A single fluoropolymer may be incorporated or any combination of two or more in any ratio may be incorporated.

The fluoropolymer content, expressed per 100 mass parts of the total of the polycarbonate resin (A) and the filler (B), is at least 0.001 mass parts and is preferably at least 0.01 mass parts, more preferably at least 0.05 mass parts, and particularly preferably at least 0.1 mass parts, and is not more than 1 mass parts and preferably not more than 0.75 mass parts and more preferably not more than 0.5 mass parts. When the fluoropolymer content is less than the indicated lower limit value, the flame retardancy improving-effect due to the fluoropolymer may be inadequate; when the fluoropolymer content exceeds the indicated upper limit value, the moldings formed from the polycarbonate resin composition may have appearance defects and/or a reduced mechanical strength.

[The Elastomer (E)]

The polycarbonate resin composition of the present invention preferably also incorporates an elastomer. The impact resistance of the polycarbonate resin composition can be improved by incorporating an elastomer.

The elastomer used in the present invention is preferably a graft copolymer as obtained by graft copolymerization onto a rubbery polymer of a monomer component copolymerizable therewith. The method of producing the graft copolymer may be any production method selected from bulk polymerization, solution polymerization, suspension polymerization, emulsion polymerization, and so forth, while the copolymerization regime may be a single-stage grafting or a multistage grafting. Viewed from the perspective of the productivity and facile control of the particle diameter, emulsion polymerization methods are preferred and multistage emulsion polymerization methods are more preferred. The polymerization method described in Japanese Patent Application Laid-open No. 2003-261629 is an example of a multistage emulsion polymerization method.

The rubbery polymer generally has a glass-transition temperature of not more than 0° C. and preferably equal to or less than −20° C. and more preferably equal to or less than −30° C. The rubber component can be specifically exemplified by polybutadiene rubbers; (partially) hydrogenated polybutadiene rubbers; butadiene-type rubbers such as copolymers of butadiene with at least 1 vinylic monomer copolymerizable with butadiene, e.g., butadiene-styrene copolymers, (partially) hydrogenated polybutadiene-styrene copolymers, butadiene-styrene block copolymers, (partially) hydrogenated polybutadiene-styrene block copolymers, butadiene-acrylonitrile copolymers, and acrylic-type rubber copolymers in which the main component is butadiene-isobutyl acrylate; isobutylene-type rubbers such as polyisobutylene, polyisobutylene-styrene copolymers, and polyisobutylene-styrene block copolymers; polyisoprene rubbers; polyalkyl acrylate rubbers such as polybutyl acrylate, poly(2-ethylhexyl acrylate), and butyl acrylate•2-ethylhexyl acrylate copolymer; silicone rubbers such as polyorganosiloxane rubbers; butadiene-acrylic composite rubbers and interpenetrating polymer network (IPN)-type composite rubbers composed of a polyorganosiloxane rubber and a polyalkyl acrylate rubber; ethylene-α-olefin rubbers such as ethylene-propylene rubbers, ethylene-butene rubbers, and ethylene-octene rubbers; ethylene-acrylic rubbers; and fluororubbers. A single one of these may be used or a mixture of two or more may be used.

Preferred among the preceding from the standpoint of the mechanical properties and surface appearance are polybutadiene rubbers, butadiene-styrene copolymers, polyalkyl acrylate rubbers, polyorganosiloxane rubbers, and IPN-type composite rubbers composed of a polyorganosiloxane rubber and a polyalkyl acrylate rubber.

The monomer component that is graft copolymerizable with the rubber component can be specifically exemplified by aromatic vinyl compounds; vinyl cyanide compounds; (meth)acrylate ester compounds; (meth)acrylic acid compounds; epoxy group-containing (meth)acrylate ester compounds such as glycidyl(meth)acrylate; maleimide compounds such as maleimide, N-methylmaleimide, and N-phenylmaleimide; and α,β-unsaturated carboxylic acid compounds, e.g., maleic acid, phthalic acid, and itaconic acid, and their anhydrides (for example, maleic anhydride). A single one of these monomer components may be used or two or more may be used in combination.

Preferred among the preceding from the standpoint of the mechanical properties and surface appearance are aromatic vinyl compounds, vinyl cyanide compounds, and (meth)acrylate ester compounds, while (meth)acrylate ester compounds are more preferred. The (meth)acrylate ester compounds can be specifically exemplified by methyl(meth)acrylate, ethyl (meth)acrylate, butyl(meth)acrylate, cyclohexyl(meth)acrylate, and octyl(meth)acrylate.

In this Description, "(meth)acrylic" indicates one or both of "acrylic" and "methacrylic", and the same also applies to "(meth)acrylate", "(meth)acrylo", and the like.

The rubber component-copolymerized graft copolymer is preferably a core/shell graft copolymer type from the standpoint of the impact resistance and surface appearance. Particularly preferred here are core/shell graft copolymers composed of a core layer that is at least one rubber component selected from polybutadiene-containing rubber, polybutyl acrylate-containing rubber, polyorganosiloxane rubber, and IPN-type composite rubber composed of a polyorganosiloxane rubber and a polyalkyl acrylate rubber, and a shell layer that is formed by the copolymerization of a (meth)acrylate ester on the periphery of the core layer. This core/shell graft copolymer preferably contains at least 40 mass % of the rubber component and more preferably contains at least 60 mass % of the rubber component. In addition, it preferably contains at least 10 mass % (meth)acrylic acid.

Preferred specific examples of these core/shell graft copolymers are methyl methacrylate-butadiene-styrene copolymer (MBS), methyl methacrylate-acrylonitrile-butadiene-styrene copolymer (MABS), methyl methacrylate-butadiene copolymer (MB), methyl methacrylate-acrylic rubber copolymer (MA), methyl methacrylate-acrylic rubber-styrene copolymer (MAS), methyl methacrylate-acrylic•butadiene rubber copolymer, methyl methacrylate-acrylic•butadiene rubber-styrene copolymer, and methyl methacrylate-(acrylic•silicone IPN rubber) copolymer. A single one of these rubbery polymers may be used by itself or two or more may be used in combination.

These core/shell graft copolymers can be exemplified by "Paraloid (registered trademark, also applies to the following) EXL2602", "Paraloid EXL2603", "Paraloid EXL2655", "Paraloid EXL2311", "Paraloid EXL2313", "Paraloid EXL2315", "Paraloid KM330", "Paraloid KM336P", and "Paraloid KCZ201" from Rohm and Hass Japan Co., Ltd.;

"Metablen (registered trademark, also applies to the following) C-223A", "Metablen E-901", "Metablen S-2001", and "Metablen SRK-200" from Mitsubishi Rayon Co., Ltd.; and "Kane Ace (registered trademark, also applies to the following) M-511", "Kane Ace M-711", "Kane Ace M-731", "Kane Ace M-600" "Kane Ace M-400", "Kane Ace M-580", and "Kane Ace MR-01" from the Kaneka Corporation.

The content of the elastomer (E) in the present invention, expressed per 100 mass parts of the total of the polycarbonate resin (A) and the filler (B), is preferably at least 0.5 mass parts, more preferably at least 1 mass parts, and even more preferably at least 1.5 mass parts, and is preferably not more than 10 mass parts, more preferably not more than 8 mass parts, even more preferably not more than 6 mass parts, and particularly preferably not more than 5 mass parts. The improvement in the flame retardancy and impact resistance obtained by the elastomer may be inadequate when the elastomer content is less than the indicated lower limit value, while when the elastomer content exceeds the indicated upper limit value the flame retardancy and heat resistance may be reduced and a poor appearance may be produced in moldings formed from the polycarbonate resin composition.

[The Styrenic Resin (F)]

The polycarbonate resin composition of the present invention may contain a styrenic resin.

This styrenic resin is a resin obtained by the polymerization of styrenic monomer and optionally at least one selection from other vinylic monomers and rubbery polymers copolymerizable with the styrenic monomer.

The styrenic monomer used for the styrenic resin can be exemplified by styrene and styrene derivatives such as α-methylstyrene, o-methylstyrene, p-methylstyrene, vinylxylene, ethylstyrene, dimethylstyrene, p-tert-butylstyrene, vinylnaphthalene, methoxystyrene, monobromostyrene, dibromostyrene, fluorostyrene, and tribromostyrene, with styrene being particularly preferred. A single one of these may be used by itself or a mixture of two or more may be used.

The other vinylic monomer copolymerizable with these styrenic monomers can be exemplified by vinyl cyanide compounds such as acrylonitrile and methacrylonitrile; aryl esters of acrylic acid, such as phenyl acrylate and benzyl acrylate; alkyl esters of acrylic acid, such as methyl acrylate, ethyl acrylate, propyl acrylate, butyl acrylate, amyl acrylate, hexyl acrylate, 2-ethylhexyl acrylate, octyl acrylate, cyclohexyl acrylate, and dodecyl acrylate; aryl esters of methacrylic acid, such as phenyl methacrylate and benzyl methacrylate; alkyl esters of methacrylic acid, such as methyl methacrylate, ethyl methacrylate, propyl methacrylate, butyl methacrylate, amyl methacrylate, hexyl methacrylate, 2-ethylhexyl methacrylate, octyl methacrylate, cyclohexyl methacrylate, and dodecyl methacrylate; epoxy group-containing methacrylate esters such as glycidyl methacrylate; maleimide-type monomers such as maleimide, N-methylmaleimide, and N-phenylmaleimide; and α,β-unsaturated carboxylic acids and their anhydrides, such as acrylic acid, methacrylic acid, maleic acid, maleic anhydride, phthalic acid, and itaconic acid. The alkyl acrylate esters and alkyl methacrylate esters are preferred.

A single one of these vinylic monomers may be used by itself or a mixture of two or more may be used.

Rubbers with a glass-transition temperature of 10° C. or below are favorable for the rubbery polymer that is copolymerizable with the styrenic monomer. Such rubbery polymers can be specifically exemplified by diene rubbers, acrylic rubbers, ethylene•propylene rubbers, silicon rubbers, and composite rubbers (IPN rubbers) that have a structure in which a polyorganosiloxane rubber component and a polyalkyl(meth)acrylate rubber component have become intertwined to the point of being inseparable, whereamong diene rubbers and acrylic rubbers are preferred.

The diene rubbers can be exemplified by polybutadiene, styrene-butadiene random copolymers and block copolymers, acrylonitrile-butadiene copolymers, polyisoprene, butadiene-isoprene copolymers, ethylene-propylene-non-conjugated diene terpolymers such as ethylene-propylene-hexadiene copolymers, butadiene-lower alkyl(meth)acrylate ester copolymers, and butadiene-styrene-lower alkyl(meth)acrylate ester copolymers.

The lower alkyl(meth)acrylate ester here can be exemplified by methyl acrylate, ethyl acrylate, methyl methacrylate, and ethyl methacrylate.

The proportion of the lower alkyl(meth)acrylate ester in the butadiene-lower alkyl(meth)acrylate ester copolymer or butadiene-styrene-lower alkyl(meth)acrylate ester copolymer is preferably not more than 30 mass % of the mass of the rubber.

The acrylic rubbers can be exemplified by alkyl acrylate ester rubbers wherein the number of carbons in the alkyl group here is preferably 1 to 8. The alkyl acrylate ester can be specifically exemplified by ethyl acrylate, butyl acrylate, and ethylhexyl acrylate. An ethylenically unsaturated monomer may also optionally be used in the alkyl acrylate ester rubber. Such compounds can be specifically exemplified by di(meth)acrylates, divinylbenzene, trivinylbenzene, triallyl cyanurate, allyl(meth)acrylate, butadiene, and isoprene. The acrylic rubbers can be further exemplified by core-shell polymers that have a crosslinked diene rubber for the core.

A single one of these rubbery polymers may be used by itself or a mixture of two or more may be used.

The styrenic resin used by the present invention can be exemplified by styrene homopolymers; copolymers of styrene and (meth)acrylonitrile; copolymers of styrene and alkyl (meth)acrylate ester; copolymers of styrene, (meth)acrylonitrile, and another copolymerizable monomer; graft copolymers obtained by the polymerization of styrene in the presence of a rubber; and graft copolymers obtained by the graft polymerization of styrene and (meth)acrylonitrile in the presence of a rubber.

Additional specific examples are resins such as polystyrene, styrene•butadiene•styrene copolymers (SBS resins), hydrogenated styrene•butadiene•styrene copolymers (hydrogenated SBS resins), hydrogenated styrene-isoprene-styrene copolymers (SEPS), impact-resistant polystyrene (HIPS), acrylonitrile-styrene copolymers (AS resins), styrene-maleic anhydride copolymers (SMA resins), acrylonitrile-butadiene-styrene copolymers (ABS resins), acrylonitrile-styrene-acrylic rubber copolymers (ASA resins), methyl methacrylate-butadiene-styrene copolymers (MBS resins), methyl methacrylate-acrylonitrile-butadiene-styrene copolymers (MABS resins), acrylonitrile-acrylic rubber-styrene copolymers (AAS resins), acrylonitrile-ethylene/propylene rubber-styrene copolymers (AES resins), and styrene-IPN rubber copolymers, as well as mixtures of the preceding. This may also be styrenic resin that exhibits stereoregularity, such as syndiotactic polystyrene. In addition, aromatic vinylic monomers may be broadly used in place of styrene in the preceding.

Preferred among the preceding are acrylonitrile-butadiene-styrene copolymers (ABS resins), acrylonitrile-styrene-acrylic rubber copolymers (ASA resins), and acrylonitrile-ethylene/propylene rubber-styrene copolymers (AES resins), while acrylonitrile-butadiene-styrene copolymers (ABS) resins are particularly preferred.

The method of producing these styrenic resins can be exemplified by known methods, e.g., emulsion polymerization methods, solution polymerization methods, suspension polymerization methods, bulk polymerization methods, and so forth.

A single one of these styrenic resins may be used by itself or a mixture of two or more may be used.

The preferred content for the styrenic resin (F), expressed per 100 mass parts of the total of the polycarbonate resin (A) and the filler (B), is 0.5 to 20 mass parts of the styrenic resin (F), and is more preferably 2 to 15 mass parts and even more preferably 3 to 10 mass parts. A satisfactory improvement in molding appearance and impact resistance due to the incorporation of the styrenic resin (F) cannot be obtained when the content of the styrenic resin (F) in the polycarbonate resin composition is less than the indicated lower limit, while the heat resistance and surface hardness enter declining trends when the indicated upper limit is exceeded.

[Phosphorus-based Stabilizers]

The polycarbonate resin composition of the present invention may optionally contain a phosphorus-based stabilizer.

Any known phosphorus-based stabilizer can be used as this phosphorus-based stabilizer. Specific examples are oxyacids of phosphorus, such as phosphoric acid, phosphonic acid, phosphorous acid, phosphinic acid, and polyphosphoric acids; acid pyrophosphate metal salts, such as acid sodium pyrophosphate, acid potassium pyrophosphate, and acid calcium pyrophosphate; phosphate salts with Group 1 or Group 2B metals, such as potassium phosphate, sodium phosphate, cesium phosphate, and zinc phosphate; as well as organophosphate compounds, organophosphite compounds, and organophosphonite compounds, with organophosphite compounds being particularly preferred.

The organophosphite compounds can be exemplified by triphenyl phosphite, tris(monononylphenyl)phosphite, tris(mononyl/dinonylphenyl)phosphite, tris(2,4-di-tert-butylphenyl)phosphite, monooctyl diphenyl phosphite, dioctyl monophenyl phosphite, monodecyl diphenyl phosphite, didecyl monophenyl phosphite, tridecyl phosphite, trilauryl phosphite, tristearyl phosphite, and 2,2-methylenebis(4,6-di-tert-butylphenyl)octyl phosphite.

Such organophosphite compounds can be specifically exemplified by "ADK Stab 1178", "ADK Stab 2112", and "ADK Stab HP-10" from the ADEKA Corporation; "JP-351", "JP-360", and "JP-3CP" from Johoku Chemical Co., Ltd.; and "Irgafos 168" from BASF.

A single one of these phosphorus-based stabilizers may be incorporated or any combination of two or more in any ratio may be incorporated.

The content of the phosphorus-based stabilizer, expressed with reference to 100 mass parts of the total of the polycarbonate resin (A) and the filler (B), is generally at least 0.001 mass parts and preferably at least 0.01 mass parts and more preferably at least 0.02 mass parts and generally not more than 1 mass parts and preferably not more than 0.7 mass parts and more preferably not more than 0.5 mass parts. The heat stabilizing effect may be inadequate when the content of the phosphorus-based stabilizer is less than the indicated lower limit value, while the effect may level off at a phosphorus-based additive content above the indicated upper limit value, which is thus uneconomical.

[Phenolic Stabilizers]

The polycarbonate resin composition of the present invention preferably also incorporates a phenolic stabilizer.

The phenolic stabilizer can be exemplified by hindered phenol antioxidants. It can be specifically exemplified by pentaerythritol tetrakis[3-(3,5-di-tert-butyl-4-hydroxyphenyl)propionate], octadecyl 3-(3,5-di-tert-butyl-4-hydroxyphenyl)propionate, thiodiethylenebis[3-(3,5-di-tert-butyl-4-hydroxyphenyl)propionate], N,N'-hexan-1,6-diylbis[3-(3,5-di-tert-butyl-4-hydroxyphenyl)propionamide], 2,4-dimethyl-6-(1-methylpentadecyl)phenol, diethyl[[3,5-bis(1,1-dimethylethyl)-4-hydroxyphenyl]methyl]phosphoate, 3,3',3",5,5',5"-hexa-tert-butyl-a,a',a"-(mesitylen-2,4,6-triyl)tri-p-cresol, 4,6-bis(octylthiomethyl)-o-cresol, ethylenebis(oxyethylene)bis[3-(5-tert-butyl-4-hydroxy-m-tolyl) propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazin-2-ylamino) phenol, and 2-[1-(2-hydroxy-3,5-di-tert-pentylphenyl) ethyl]-4,6-di-tert-pentylphenyl acrylate.

Preferred among the preceding are pentaerythritol tetrakis [3-(3,5-di-tert-butyl-4-hydroxyphenyl)propionate] and octadecyl 3-(3,5-di-tert-butyl-4-hydroxyphenyl)propionate. These phenolic antioxidants can be specifically exemplified by "Irganox 1010" and "Irganox 1076" from BASF and "ADK Stab AO-50" and "ADK Stab AO-60" from the ADEKA Corporation.

A single one of these phenolic stabilizers may be incorporated or any combination of two or more in any ratio may be incorporated.

The content of the phenolic stabilizer, expressed per 100 mass parts of the total of the polycarbonate resin (A) and the filler (B), is generally at least 0.001 mass parts and preferably at least 0.01 mass parts and generally not more than 1 mass parts and preferably not more than 0.5 mass parts. The effect as a phenolic stabilizer may be inadequate when the content of the phenolic stabilizer is less than the indicated lower limit value, while the effect may level off at a phenolic stabilizer content above the indicated upper limit value, which is thus uneconomical.

[Lubricants (Release Agents)]

As necessary, the polycarbonate resin composition of the present invention preferably also incorporates a lubricant (release agent). This lubricant can be exemplified by aliphatic carboxylic acids, esters between an alcohol and an aliphatic carboxylic acid, aliphatic hydrocarbon compounds having a number-average molecular weight of 200 to 15,000, and polysiloxane-type silicone oils.

The aliphatic carboxylic acid can be exemplified by saturated and unsaturated aliphatic monovalent, divalent, and trivalent carboxylic acids. This aliphatic carboxylic acid also encompasses alicyclic carboxylic acids. Within this sphere, monovalent and divalent carboxylic acids having 6 to 36 carbons are preferred aliphatic carboxylic acids, while aliphatic saturated monovalent carboxylic acids having 6 to 36 carbons are more preferred. These aliphatic carboxylic acids can be specifically exemplified by palmitic acid, stearic acid, caproic acid, capric acid, lauric acid, arachidic acid, behenic acid, lignoceric acid, cerotic acid, melissic acid, tetratriacontanoic acid, montanic acid, adipic acid, and azelaic acid.

The aliphatic carboxylic acid in the aliphatic carboxylic acid/alcohol ester, for example, may be the same as the aliphatic carboxylic acids indicated above. The alcohol, on the other hand, can be exemplified by saturated and unsaturated monohydric and polyhydric alcohols. This alcohol may contain, for example, the fluorine atom or a substituent such as an aryl group. Among the preceding, monohydric and polyhydric saturated alcohols having 30 or fewer carbons are preferred and saturated aliphatic monohydric alcohols having 30 or fewer carbons and saturated aliphatic polyhydric alcohols having 30 or fewer carbons are more preferred. Here, aliphatic is used as a term that also encompasses alicyclic compounds.

This alcohol can be specifically exemplified by octanol, decanol, dodecanol, stearyl alcohol, behenyl alcohol, ethylene glycol, diethylene glycol, glycerol, pentaerythritol, 2,2-dihydroxyperfluoropropanol, neopentylene glycol, ditrimethylolpropane, and dipentaerythritol.

The ester may contain an aliphatic carboxylic acid and/or an alcohol as an impurity. In addition, this ester may be a pure material or may be a mixture of a plurality of compounds. The aliphatic carboxylic acid bonded as an ester constituent may be a single aliphatic carboxylic acid or may be any combination of two or more in any ratio, and the alcohol bonded as an ester constituent may be a single alcohol or may be any combination of two or more in any ratio.

The aliphatic carboxylic acid/alcohol ester can be specifically exemplified by beeswax (a mixture in which the main component is myristyl palmitate), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate, and pentaerythritol tetrastearate.

The aliphatic hydrocarbon with a number-average molecular weight of 200 to 15,000 can be exemplified by liquid paraffins, paraffin waxes, microcrystalline waxes, polyethylene waxes, Fischer-Tropsch waxes, and α-olefin oligomers having 3 to 12 carbons. This aliphatic hydrocarbon also encompasses alicyclic hydrocarbons. This hydrocarbon may be partially oxidized.

Preferred among the preceding are paraffin waxes, polyethylene waxes, and partially oxidized polyethylene waxes, while paraffin waxes and polyethylene waxes are more preferred.

The number-average molecular weight of this aliphatic hydrocarbon is preferably not greater than 5000.

The aliphatic hydrocarbon may be a single substance, but a mixture of different constituent components or molecular weights may also be used as long as the main component is within the range indicated above.

The polysiloxane-type silicone oil can be exemplified by dimethylsilicone oils, methylphenylsilicone oils, diphenylsilicone oils, and fluorinated alkylsilicones.

A single lubricant as described above may be incorporated or any combination of two or more in any ratio may be incorporated.

The content of the lubricant, expressed per 100 mass parts of the total of the polycarbonate resin (A) and the filler (B), is generally at least 0.001 mass parts and is preferably at least 0.01 mass parts and is generally not more than 2 mass parts and is preferably not more than 1 mass parts. The releasing effect may be inadequate when the lubricant content is less than the indicated lower limit, while the hydrolysis resistance may decline and mold staining during injection molding may be produced when the lubricant content exceeds the indicated upper limit.

[Other Components]

Insofar as the desired properties are not substantially impaired, the polycarbonate resin composition of the present invention may as necessary contain components other than those described in the preceding. These other components can be exemplified by resins other than polycarbonate resins and by various resin additives. A single one of these other components may be incorporated or any combination of two or more in any ratio may be incorporated.

Other Resins

The other resin can be exemplified by thermoplastic polyester resins such as polyethylene terephthalate resin, polytrimethylene terephthalate, and polybutylene terephthalate resin; polyolefin resins such as polyethylene resin and polypropylene resin; polyamide resins; polyimide resins; polyetherimide resins; polyurethane resins; polyphenylene ether resins; polyphenylene sulfide resins; polysulfone resins; and polymethacrylate resins.

A single one of these other resins may be incorporated or any combination of two or more in any ratio may be incorporated.

Resin Additives

The resin additives can be exemplified by ultraviolet absorbers, dyes and pigments, static inhibitors, anti-fogging agents, anti-blocking, flow improvers, plasticizers, dispersing agents, and antimicrobial agents. A single resin additive may be incorporated or any combination of two or more in any ratio may be incorporated.

Examples of suitable additives for the polycarbonate resin composition of the present invention are specifically described in the following.

Ultraviolet Absorbers

The ultraviolet absorber can be exemplified by inorganic ultraviolet absorbers such as cerium oxide and zinc oxide, and by organic ultraviolet absorbers such as benzotriazole compounds, benzophenone compounds, salicylate compounds, cyanoacrylate compounds, triazine compounds, oxanilide compounds, malonate ester compounds, and hindered amine compounds. Organic ultraviolet absorbers are preferred between the two, and benzotriazole compounds are more preferred. The polycarbonate resin composition of the present invention can be provided with an excellent transparency and excellent mechanical properties by the selection of an organic ultraviolet absorber.

The benzotriazole compounds can be specifically exemplified by 2-(2'-hydroxy-5'-methylphenyl)benzotriazole, 2-[2'-hydroxy-3',5'-bis(α,α-dimethylbenzyl)phenyl]benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amyl)benzotriazole, 2-(2'-hydroxy-5'-tert-octylphenyl)benzotriazole, and 2,2'-methylenebis[4-(1,1,3,3-tetramethylbutyl)-6-(2H-benzotriazol-2-yl)phenol], whereamong 2-(2'-hydroxy-5'-tert-octylphenyl)benzotriazole and 2,2'-methylenebis[4-(1,1,3,3-tetramethylbutyl)-6-(2H-benzotriazol-2-yl)phenol] are preferred and 2-(2'-hydroxy-5'-tert-octylphenyl)benzotriazole is particularly preferred.

These benzotriazole compounds can be specifically exemplified by "Seesorb 701", "Seesorb 705", "Seesorb 703", "Seesorb 702", "Seesorb 704", and "Seesorb 709" from Shipro Kasei Kaisha, Ltd.; "Viosorb 520", "Viosorb 582", "Viosorb 580", and "Viosorb 583" from Kyodo Chemical Co., Ltd.; "Kemisorb 71" and "Kemisorb 72" from Chemipro Kasei Kaisha, Ltd.; "Cyasorb UV5411" from Cytex Industries Inc.; "LA-32", "LA-38", "LA-36", "LA-34", and "LA-31" from the ADEKA Corporation; and "Tinuvin P", "Tinuvin 234", "Tinuvin 326", "Tinuvin 327", and "Tinuvin 328" from BASF.

The benzophenone compounds can be specifically exemplified by 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodecyloxybenzophenone, bis(5-benzoyl-4-hydroxy-2-methoxyphenyl) methane, 2,2'-dihydroxy-4-methoxybenzophenone, and 2,2'-dihydroxy-4,4'-dimethoxybenzophenone. These benzophenone compounds can be specifically exemplified by "Seesorb 100", "Seesorb 101", "Seesorb 101S", "Seesorb 102", and "Seesorb 103" from Shipro Kasei Kaisha, Ltd.; "Viosorb 100", "Viosorb 110", and "Viosorb 130" from Kyodo Chemical Co., Ltd.; "Kemisorb 10", "Kemisorb 11", "Kemisorb 11S", "Kemisorb 12", "Kemisorb 13", and "Kemisorb 111" from Chemipro Kasei Kaisha, Ltd.; "Uvinul 400", "Uvinul M-40", and "Uvinul MS-40" from BASF; "Cyasorb UV9", "Cyasorb UV284", "Cyasorb UV531", and "Cyasorb UV24" from Cytex Industries Inc.; and "ADK Stab 1413" and "ADK Stab LA-51" from the ADEKA Corporation.

The salicylate compounds can be specifically exemplified by phenyl salicylate and 4-tert-butylphenyl salicylate. These salicylate compounds can be specifically exemplified by "Seesorb 201" and "Seesorb 202" from Shipro Kasei Kaisha, Ltd., and "Kemisorb 21" and "Kemisorb 22" from Chemipro Kasei Kaisha, Ltd.

The cyanoacrylate compounds can be specifically exemplified by ethyl 2-cyano-3,3-diphenylacrylate and 2-ethylhexyl 2-cyano-3,3-diphenylacrylate. These cyanoacrylate compounds can be specifically exemplified by "Seesorb 501" from Shipro Kasei Kaisha, Ltd., "Viosorb 910" from Kyodo Chemical Co., Ltd., "Uvisolator 300" from Daiichi Kasei Co., Ltd., and "Uvinul N-35" and "Uvinul N-539" from BASF.

The triazine compound can be exemplified by compounds that have the 1,3,5-triazine skeleton, and these triazine compounds can be specifically exemplified by "LA-46" from the ADEKA Corporation and "Tinuvin 1577ED", "Tinuvin 400", "Tinuvin 405", "Tinuvin 460", "Tinuvin 477-DW", and "Tinuvin 479" from BASF.

The oxanilide compound is specifically exemplified by 2-ethoxy-2'-ethyloxalic acid bisanilide, and this oxanilide compound can be specifically exemplified by "Sanduvor VSU" from Clariant (Japan) KK.

The malonate ester compound is preferably a 2-(alkylidene)malonate ester and is more preferably a 2-(1-arylalkylidene)malonate ester. These malonate ester compounds can be specifically exemplified by "PR-25" from Clariant (Japan) KK and "B-CAP" from BASF.

The content of the ultraviolet absorber, expressed per 100 mass parts of the total of the polycarbonate resin (A) and the filler (B), is generally at least 0.01 mass parts and preferably at least 0.1 mass parts and is generally not more than 3 mass parts and preferably not more than 1 mass parts. The improvement in the weathering resistance may be inadequate when the content of the ultraviolet absorber is less than the indicated lower limit, while mold deposits and mold staining may be produced when the content of the ultraviolet absorber exceeds the indicated upper limit. A single ultraviolet absorber may be incorporated or any combination of two or more in any ratio may be incorporated.

Colorants

The colorant can be exemplified by inorganic pigments, organic pigments, and organic dyes.

The inorganic pigments can be exemplified by sulfide pigments such as cadmium red and cadmium yellow; silicate pigments such as ultramarine blue; oxide pigments such as titanium oxide, zinc white, iron oxide red, chromium oxide, iron black, titanium yellow, zinc-iron black, titanium cobalt green, cobalt green, cobalt blue, copper-chromium black, and copper-iron black; chromate pigments such as chrome yellow and molybdate orange; and ferrocyanide pigments such as Prussian blue.

The organic pigments and organic dyes can be exemplified by phthalocyanine colorants such as copper phthalocyanine blue and copper phthalocyanine green; azo colorants such as nickel azo yellow; condensed polycyclic colorants such as thioindigo systems, perinone systems, perylene systems, quinacridone systems, dioxazine systems, isoindolinone systems, and quinophthalone systems; and colorants such as anthraquinone systems, heterocyclic systems, and methyl systems.

Preferred among the preceding from the standpoint of the thermal stability are titanium oxide, cyanine system compounds, quinoline system compounds, anthraquinone system compounds, and phthalocyanine system compounds.

A single colorant may be incorporated or any combination of two or more in any ratio may be incorporated.

The colorant content, expressed per 100 mass parts of the total of the polycarbonate resin (A) and the filler (B), is generally not more than 5 mass parts and preferably not more than 3 mass parts and more preferably not more than 2 mass parts. The impact resistance may not be satisfactory when the colorant content is too large.

[Method of Producing the Polycarbonate Resin Composition]

There are no limitations on the method of producing the polycarbonate resin composition of the present invention, and known methods of producing polycarbonate resin compositions can be broadly used.

A specific example here is a method in which the polycarbonate resin (A), the filler (B), the phosphazene compound (C), the fluoropolymer (D), and the other components to be blended on an optional basis are pre-mixed using any of various mixers, e.g., a tumbler, Henschel mixer, and so forth, followed by melt-mixing with a mixer such as a Banbury mixer, roll, Brabender, single-screw mixing extruder, twin-screw mixing extruder, kneader, and so forth.

In addition, for example, the polycarbonate resin composition of the present invention may also be produced without pre-mixing the individual components, or with pre-mixing of only some of the components, and performing melt-mixing while feeding to an extruder using a feeder. Otherwise, for example, the polycarbonate resin composition of the present invention may also be produced by making a masterbatch of a resin composition obtained by premixing some of the components and feeding to an extruder and melt-mixing, and then re-mixing this masterbatch with the remaining components and melt-mixing. When a hard-to-disperse component must be admixed, for example, the dispersibility can be raised by preliminarily dissolving or dispersing such a hard-to-disperse component in water or an organic solvent and carrying out mixing with the resulting solution or dispersion.

Melt-mixing and extrusion are more preferably carried out as follows because this reduces breakage of the filler (B) and enables stable mixing to be performed: the polycarbonate resin (A), phosphazene compound (C), fluoropolymer (D), and other components that are to be blended on an optional basis are fed together from the hopper of the extruder and the filler (B) is fed from a side feed port.

EXAMPLES

The present invention is described more specifically below through examples. However, the present invention is not limited to or by the following examples, and any modification can be carried out in a range that does not depart from the essential features of the present invention. In the following description, "parts" is on a mass basis, unless specifically indicated otherwise, and represents "mass parts".

The following methods were used to evaluate the produced polycarbonate resin compositions.

[Evaluation of the Flame Retardancy (UL 94)]

The flame retardancy of the particular polycarbonate resin composition was evaluated in accordance with the UL 94 test (Flammability of Plastic Materials for Parts in Devices and Appliances) established by the Underwriters Laboratory (UL) (USA), after conditioning the UL test-qualified test specimen (thickness=0.8 mm, 1.0 mm, or 1.2 mm) obtained by the method described below for 48 hours in a thermostatted chamber at a temperature of 23° C. and a humidity of 50%. UL 94V is a method that evaluates the flame retardancy based on the residual flame time and the dripping behavior after a burner flame has been directly applied for 10 seconds to a test specimen of prescribed size held vertically. The criteria given in Table 1 below must be satisfied in order to rate a flame retardancy of V-0, V-1, or V-2.

TABLE 1

|  | V-0 | V-1 | V-2 |
| --- | --- | --- | --- |
| residual flame time for the individual specimen | not more than 10 seconds | not more than 30 seconds | not more than 30 seconds |
| total residual flame time for the 5 specimens | not more than 50 seconds | not more than 250 seconds | not more than 250 seconds |
| cotton ignition due to dripping | does not occur | does not occur | occurs |

The residual flame time here is the length of time for which flaming combustion of the test specimen continues after the ignition source has been removed. The cotton ignition due to dripping is determined by whether or not the indicator cotton placed about 300 mm below the lower end of the test specimen is ignited by material dripping (drips) from the test specimen. The results are reported in the tables as the "flame retardancy".

[Rigidity (Modulus of Elasticity)]

This was evaluated by measuring the flexural modulus of elasticity (GPa) in conformity with ISO 178 using the ISO multipurpose test specimen (thickness=4 mm) obtained by the method described below. This is reported as the "modulus of elasticity" in the tables.

[Impact Resistance]

This was evaluated by measuring the notched Charpy impact value (kJ/m$^2$) in conformity with ISO 179 using the ISO multipurpose test specimen (thickness=3 mm) obtained by the method described below. This is reported as the "impact resistance" in the tables.

[Heat Resistance]

This was evaluated by measuring the deflection temperature (° C.) under a load of 1.80 MPa in conformity with ISO 75 using the ISO multipurpose test specimen (thickness=4 mm) obtained by the method described below. This is reported as the "heat resistance" in the tables.

[Wet Heat Stability]

The tensile strength ("initial TS") was measured in conformity to ISO 527 using the ISO multipurpose test specimen (thickness=4 mm) obtained by the method described below.

The tensile strength ("1000h TS") was similarly measured after the ISO multipurpose test specimen (thickness=4 mm) had been treated for 1000 hours at a temperature of 70° C. and a relative humidity of 90% using a thermostat/humidistat. The wet heat stability was evaluated by determining the tensile strength retention ratio [(1000h TS)/(initial TS)×100] (unit: %) after the test. A larger value here indicates a better wet heat stability. This is reported as the "wet heat stability" in the tables.

[Warping Resistance]

The dimensions were determined in the MD direction (flow direction) and TD direction (direction perpendicular to the flow direction) of the flat plate molding obtained by the method described below and the mold shrinkage for each of these directions was determined from these values. The warping resistance was evaluated by then calculating the ratio between the shrinkage in the MD direction and the shrinkage in the TD direction (MD direction shrinkage/TD direction shrinkage). The closer this value is to 1, the better the warping resistance, which is preferred. This is reported in the tables as the "warping resistance".

<Invention Examples of Compositions Formed of Polycarbonate/Glass Fiber/Phosphazene/Fluoropolymer>

[Production of Resin Pellets]

The components indicated in Table 2 below, with the exception of the glass fiber, were combined in the proportions (mass ratios) given in Tables 3 and 4 and were mixed for 20 minutes with a tumbler and then fed from an upstream feeder to a twin-screw extruder equipped with 1 vent (TEX30HSST from The Japan Steel Works, Ltd.). While the glass fiber was being fed in the middle of the barrel from a side feeder, mixing was performed at 200 rpm at a barrel temperature of 280° C. and a discharge rate of 15 kg/hour. The molten resin extruded in strand form was quenched in a water tank and pelletized using a pelletizer to obtain pellets of the polycarbonate resin composition.

[Test Specimen Fabrication]

The pellets yielded by this production method were dried for 5 hours at 80° C. and were then injection molded using an injection molder (SE100DU from Sumitomo Heavy Industries, Ltd.) at a cylinder temperature of 280° C. and a mold temperature of 80° C. to mold a UL test-qualified test specimen having a length of 125 mm, a width of 13 mm, and a thickness of 0.8 mm.

Similarly, the pellets yielded by the aforementioned production method were dried for 5 hours at 80° C. and were then injection molded using an injection molder (Cycap M-2, 75 T clamping pressure, from Sumitomo Heavy Industries, Ltd.) at a cylinder temperature of 280° C. and a mold temperature of 80° C. to mold an ISO multipurpose test specimen (4 mm) and an ISO multipurpose test specimen (3 mm).

TABLE 2

|  | abbreviation |  |
| --- | --- | --- |
| polycarbonate resin | A | aromatic polycarbonate resin produced by interfacial polymerization using bisphenol A as a starting material, viscosity-average molecular weight: 21,000 |
| glass fiber | B1 | chopped glass fiber with a diameter of 13 μm and a cut length of 3 mm, from Nippon Electric Glass Co., Ltd., product name: ECS03T-571, flattening ratio on the fiber cross section: 1 to 1.1 |
|  | B2 | chopped glass fiber with a diameter of 10 μm and a cut length of 3 mm, from Nippon Electric Glass Co., Ltd., product name: ECS03T-187H, flattening ratio on the fiber cross section: 1 to 1.1 |
| carbon fiber | CF1 | chopped carbon fiber with a cut length of 6 mm, from Mitsubishi Rayon Co., Ltd., product name: Pyrofil TR-06U |
|  | CF2 | chopped carbon fiber with a cut length of 6 mm, from Mitsubishi Rayon Co., Ltd., product name: Pyrofil TR-066A |

TABLE 2-continued

| | abbreviation | |
|---|---|---|
| phosphazene | C | phenoxyphosphazene compound, from Fushimi Pharmaceutical Co., Ltd., product name: Rabitle FP-110 |
| fluoropolymer | D | fibril-forming fluoropolymer, from Daikin Industries, Ltd., product name: FA-500H |
| elastomer | E | graft copolymer obtained by the graft copolymerization of an alkyl (meth) acrylate polymer on a rubbery polymer composed of a crosslinked butadiene polymer, from Rohm and Hass, product name: EXL2603 |
| styrenic resin | F | ABS resin, from Techno Polymer Co., Ltd., product name: DP-611 |
| stabilizer | G1 | tris(2,4-di-tert-butylphenyl) phosphite, from the ADEKA Corporation, product name: ADK Stab 2112 |
| | G2 | octadecyl 3-(3,5-di-tert-butyl-4-hydroxyphenyl)propionate, from BASF, product name: Irganox 1076 |
| lubricant | G3 | polyethylene wax, from Clariant (Japan) KK, product name: Licowax PE520 |
| | G4 | stearyl stearate from the NOF Corporation, product name: Unister M9676 |
| phosphate ester | H | resorcinol bis-2,6-xylenyl phosphate, from Diahachi Chemical Industry Co., Ltd., product name: PX-200 |

TABLE 3

| | | | examples | | | | | |
|---|---|---|---|---|---|---|---|---|
| | abbreviation | unit | 1 | 2 | 3 | 4 | 5 | 6 |
| composition | A | mass parts | 80.17 | 72.17 | 62.17 | 59.17 | 54.17 | 53.67 |
| | B1 | | 10 | 20 | 30 | 30 | | 40 |
| | B2 | | | | | | 30 | |
| | C | | 9 | 7 | 7 | 7 | 10 | 5.5 |
| | D | | 0.25 | 0.25 | 0.25 | 0.25 | 0.25 | 0.25 |
| | E | | | | | 3 | | |
| | F | | | | | | 5 | |
| | G1 | | 0.03 | 0.03 | 0.03 | 0.03 | 0.03 | 0.03 |
| | G2 | | 0.05 | 0.05 | 0.05 | 0.05 | 0.05 | 0.05 |
| | G3 | | 0.5 | 0.5 | 0.5 | 0.5 | 0.5 | 0.5 |
| | H | | | | | | | |
| flame retardancy (0.8 mmt) | | | V-0 | V-0 | V-0 | V-0 | V-0 | V-0 |
| modulus of elasticity | | GPa | 3.8 | 5.6 | 8.2 | 8.1 | 8 | 11.5 |
| impact resistance | | kJ/m$^2$ | 10.1 | 13.5 | 14.2 | 15 | 14.5 | 14.1 |
| heat resistance | | °C. | 111 | 114 | 114 | 113 | 112 | 116 |
| wet heat stability | | % | 87 | 82 | 90 | 87 | 81 | 93 |

TABLE 4

| | | | comparative examples | | | | |
|---|---|---|---|---|---|---|---|
| | abbreviation | unit | 1 | 2 | 3 | 4 | 5 |
| composition | A | mass parts | 70.17 | 71.17 | 72.42 | 61.17 | 53.17 |
| | B1 | | 10 | 20 | 20 | 30 | 40 |
| | B2 | | | | | | |
| | C | | | | 7 | | |
| | D | | 0.25 | 0.25 | | 0.25 | 0.25 |
| | E | | | | | | |
| | F | | | | | | |
| | G1 | | 0.03 | 0.03 | 0.03 | 0.03 | 0.03 |
| | G2 | | 0.05 | 0.05 | 0.05 | 0.05 | 0.05 |
| | G3 | | 0.5 | 0.5 | 0.5 | 0.5 | 0.5 |
| | H | | 10 | 8 | | 8 | 6 |
| flame retardancy (0.8 mmt) | | | V-2 | V-2 | V-2 | V-2 | V-2 |
| modulus of elasticity | | GPa | 3.7 | 5.6 | 5.6 | 8 | 11.8 |
| impact resistance | | kJ/m$^2$ | 7.2 | 11.1 | 15.8 | 12.5 | 10.2 |
| heat resistance | | °C. | 108 | 110 | 112 | 108 | 109 |
| wet heat stability | | % | 20 | 24 | 83 | 32 | 35 |

As shown in the examples in Table 3, the resin compositions of the present invention, formed of polycarbonate, glass fiber, phosphazene, and fluoropolymer, are shown to have an excellent flame retardancy, rigidity, impact resistance, heat resistance, and wet heat stability.

When, on the other hand, the comparative examples in Table 4 are considered, the flame retardancy and wet heat stability deteriorate when a phosphate ester is used for the flame retardant in place of the phosphazene (Comparative Examples 1, 2, 4, and 5). The flame retardancy is also shown to deteriorate in the case of a composition that does not contain the fluoropolymer (Comparative Example 3).

<Invention Examples of Compositions Formed of Polycarbonate/Carbon Fiber/Phosphazene/Fluoropolymer>

[Production of Resin Pellets]

The components indicated in Table 2 above, with the exception of the carbon fiber (CF1 and CF2), were combined in the proportions (mass ratios) given in Tables 5 and 6 and were mixed for 20 minutes with a tumbler and then fed from an upstream feeder to a twin-screw extruder equipped with 1 vent (TEX30HSST from The Japan Steel Works, Ltd.). While the carbon fiber was being fed in the middle of the barrel from a side feeder, mixing was performed at 200 rpm at a barrel temperature of 280° C. and a discharge rate of 15 kg/hour. The molten resin extruded in strand form was quenched in a water tank and pelletized using a pelletizer to obtain pellets of the polycarbonate resin composition.

[Test Specimen Fabrication]

The obtained pellets were dried for 5 hours at 80° C. and were then injection molded using an injection molder (SE100DU from Sumitomo Heavy Industries, Ltd.) at a cylinder temperature of 280° C. and a mold temperature of 80° C. to mold a UL test-qualified test specimen having a length of 125 mm, a width of 13 mm, and a thickness of 1 mm.

Similarly, the pellets yielded by the aforementioned production method were dried for 5 hours at 80° C. and were then injection molded using an injection molder (Cycap M-2, 75 T clamping pressure, from Sumitomo Heavy Industries, Ltd.) at a cylinder temperature of 280° C. and a mold temperature of 80° C. to mold an ISO multipurpose test specimen (4 mm) and an ISO multipurpose test specimen (3 mm).

The results of the evaluations are given below in Tables 5 and 6.

TABLE 5

|  | abbreviation | unit | examples |||||| 
|  |  |  | 7 | 8 | 9 | 10 | 11 | 12 |
| --- | --- | --- | --- | --- | --- | --- | --- | --- |
| composition | A | mass parts | 72.52 | 70.52 | 67.52 | 61.52 | 57.52 | 62.52 |
|  | CF1 |  | 15 | 20 | 20 |  |  | 25 |
|  | CF2 |  |  |  |  | 20 | 20 |  |
|  | C |  | 12 | 9 | 12 | 15 | 17 | 12 |
|  | D |  | 0.25 | 0.25 | 0.25 | 0.25 | 0.25 | 0.25 |
|  | E |  |  |  |  | 3 |  |  |
|  | F |  |  |  |  |  | 5 |  |
|  | G1 |  | 0.03 | 0.03 | 0.03 | 0.03 | 0.03 | 0.03 |
|  | G2 |  | 0.05 | 0.05 | 0.05 | 0.05 | 0.05 | 0.05 |
|  | G4 |  | 0.15 | 0.15 | 0.15 | 0.15 | 0.15 | 0.15 |
|  | H |  |  |  |  |  |  |  |
| flame retardancy (1 mmt) |  |  | V-0 | V-0 | V-0 | V-0 | V-0 | V-0 |
| modulus of elasticity |  | GPa | 11.9 | 13 | 13.3 | 13.1 | 12.9 | 15.6 |
| impact resistance |  | kJ/m$^2$ | 6.2 | 6.1 | 6.4 | 6.7 | 6.3 | 5.8 |
| heat resistance |  | ° C. | 110 | 112 | 107 | 103 | 100 | 106 |

TABLE 6

|  | abbreviation | unit | comparative examples ||||
|  |  |  | 6 | 7 | 8 | 9 |
| --- | --- | --- | --- | --- | --- | --- |
| composition | A | mass parts | 79.52 | 71.52 | 72.77 | 53.52 |
|  | CF1 |  | 15 | 20 |  | 25 |
|  | CF2 |  |  |  | 20 |  |
|  | C |  |  |  |  |  |
|  | D |  | 0.25 | 0.25 | 0.25 | 0.25 |
|  | E |  |  |  |  |  |
|  | F |  |  |  |  |  |
|  | G1 |  | 0.03 | 0.03 | 0.03 | 0.03 |
|  | G2 |  | 0.05 | 0.05 | 0.05 | 0.05 |
|  | G4 |  | 0.15 | 0.15 | 0.15 | 0.15 |
|  | H |  | 15 | 15 | 15 | 15 |
| flame retardancy (1 mmt) |  |  | V-2 | V-2 | V-2 | V-2 |
| modulus of elasticity |  | GPa | 11.8 | 13.1 | 13.2 | 15.4 |
| impact resistance |  | kJ/m$^2$ | 4.1 | 3.8 | 3.7 | 3.1 |
| heat resistance |  | ° C. | 89 | 86 | 86 | 85 |

As shown in the examples in Table 5, the resin compositions of the present invention, formed of polycarbonate, carbon fiber, phosphazene, and fluoropolymer, are shown to have an excellent flame retardancy, rigidity, impact resistance, and heat resistance.

When, on the other hand, the comparative examples in Table 6 are considered, the flame retardancy, impact resistance, and heat resistance are shown to deteriorate when a phosphate ester is used for the flame retardant in place of the phosphazene.

<Invention Examples of Compositions Formed of Polycarbonate/Glass Fiber and Carbon Fiber/Phosphazene/Fluoropolymer>

[Production of Resin Pellets]

The components indicated in Table 2 above, with the exception of the glass fiber and the carbon fiber, were combined in the proportions (mass ratios) given in Tables 7 and 8 and were mixed for 20 minutes with a tumbler and then fed from an upstream feeder to a twin-screw extruder equipped with 1 vent (TEX30HSST from The Japan Steel Works, Ltd.). While the glass fiber and carbon fiber were being fed in the middle of the barrel from a side feeder, mixing was performed at 200 rpm at a barrel temperature of 280° C. and a discharge rate of 15 kg/hour. The molten resin extruded in strand form was quenched in a water tank and pelletized using a pelletizer to obtain pellets of the polycarbonate resin composition.

[Test Specimen Fabrication]

The pellets yielded by this production method were dried for 5 hours at 80° C. and were then injection molded using an injection molder (SE100DU from Sumitomo Heavy Industries, Ltd.) at a cylinder temperature of 280° C. and a mold temperature of 80° C. to mold a UL test-qualified test specimen having a length of 125 mm, a width of 13 mm, and a thickness of 0.8 mm.

Similarly, the pellets yielded by the aforementioned production method were dried for 5 hours at 80° C. and were then injection molded using an injection molder (Cycap M-2, 75 T clamping pressure, from Sumitomo Heavy Industries, Ltd.) at a cylinder temperature of 280° C. and a mold temperature of 80° C. to mold an ISO multipurpose test specimen (4 mm) and an ISO multipurpose test specimen (3 mm).

The results of the evaluation are given below in Tables 7 and 8.

As shown in the examples in Table 7, the resin compositions of the present invention, formed of polycarbonate, glass fiber and carbon fiber, phosphazene, and fluoropolymer, are demonstrated to have an excellent flame retardancy, rigidity, impact resistance, and heat resistance.

When, on the other hand, the comparative examples in Table 8 are considered, the flame retardancy, impact resistance, and heat resistance are shown to deteriorate when a phosphate ester is used for the flame retardant in place of the phosphazene (Comparative Examples 10 to 13).

<Invention Examples of Compositions Formed of Polycarbonate/Glass Fiber and Glass Flake/Phosphazene/Fluoropolymer>

[Production of Resin Pellets]

The polycarbonate resin and glass flakes described in Table 9 below were used, while the components described above were otherwise used.

TABLE 7

| | | | examples | | | | | |
|---|---|---|---|---|---|---|---|---|
| | abbreviation | unit | 13 | 14 | 15 | 16 | 17 | 18 |
| composition | A | mass | 45.27 | 57.27 | 57.27 | 59.27 | 56.27 | 54.27 |
| | B2 | parts | 30 | 20 | 20 | 15 | 10 | 10 |
| | CF1 | | 10 | 10 | | 15 | 20 | 25 |
| | CF2 | | | | 10 | | | |
| | C | | 14 | 12 | 12 | 10 | 10 | 10 |
| | D | | 0.5 | 0.5 | 0.5 | 0.5 | 0.5 | 0.5 |
| | E | | | | | | 3 | |
| | F | | | | | | | 5 |
| | G1 | | 0.03 | 0.03 | 0.03 | 0.03 | 0.03 | 0.03 |
| | G2 | | 0.05 | 0.05 | 0.05 | 0.05 | 0.05 | 0.05 |
| | G4 | | 0.15 | 0.15 | 0.15 | 0.15 | 0.15 | 0.15 |
| | H | | | | | | | |
| flame retardancy (0.8 mmt) | | | V-0 | V-0 | V-0 | V-0 | V-0 | V-0 |
| modulus of elasticity | | GPa | 15.1 | 13.8 | 14.1 | 15.5 | 15.8 | 16.9 |
| impact resistance | | kJ/m$^2$ | 10.8 | 9 | 8.6 | 9 | 8.1 | 7 |
| heat resistance | | ° C. | 100 | 102 | 102 | 102 | 104 | 102 |

TABLE 8

| | | | reference examples | | comparative examples | | | |
|---|---|---|---|---|---|---|---|---|
| | abbreviation | unit | 1 | 2 | 10 | 11 | 12 | 13 |
| composition | A | mass | 39.27 | 67.27 | 49.27 | 49.27 | 39.27 | 64.27 |
| | B2 | parts | 40 | | 20 | 25 | 45 | |
| | CF1 | | | | 15 | 10 | | 20 |
| | CF2 | | | 20 | | | | |
| | C | | 10 | 12 | | | | |
| | D | | 0.5 | 0.5 | 0.5 | 0.5 | 0.5 | 0.5 |
| | E | | | | | | | |
| | F | | | | | | | |
| | G1 | | 0.03 | 0.03 | 0.03 | 0.03 | 0.03 | 0.03 |
| | G2 | | 0.05 | 0.05 | 0.05 | 0.05 | 0.05 | 0.05 |
| | G4 | | 0.15 | 0.15 | 0.15 | 0.15 | 0.15 | 0.15 |
| | H | | | | 15 | 15 | 15 | 15 |
| flame retardancy (0.8 mmt) | | | V-0 | V-0 | V-2 | V-2 | V-2 | V-1 |
| modulus of elasticity | | GPa | 11.6 | 13.8 | 18.1 | 16.2 | 15.1 | 15 |
| impact resistance | | kJ/m$^2$ | 11.9 | 5.5 | 5.7 | 6.1 | 7.3 | 3.8 |
| heat resistance | | ° C. | 100 | 107 | 81 | 83 | 76 | 87 |

TABLE 9

| | abbreviation | |
|---|---|---|
| polycarbonate resin | A1 | aromatic polycarbonate resin produced by interfacial polymerization using bisphenol A as a starting material, viscosity-average molecular weight: 19,000, from Mitsubishi Engineering-Plastics Corporation, product name: Iupilon H3000 |
| glass flake | B3 | glass flake with an average thickness of 5 μm and an average particle size of 600 μm, from Nippon Sheet Glass Co., Ltd., product name: Fleka REFG101 |
| | B4 | glass flake with an average thickness of 0.7 μm and an average particle size of 160 μm, from Nippon Sheet Glass Co., Ltd., product name: Fleka MEG160FYX |

The components indicated in Table 10 below, with the exception of the glass fiber and glass flake, were combined in the proportions (mass ratios) given in the table and were mixed for 20 minutes with a tumbler and then fed from an upstream feeder to a twin-screw extruder equipped with 1 vent (TEX30HSST from The Japan Steel Works, Ltd.). While the glass fiber and glass flake were being fed in the middle of the barrel from a side feeder, mixing was performed at 200 rpm at a barrel temperature of 280° C. and a discharge rate of 20 kg/hour. The molten resin extruded in strand form was quenched in a water tank and pelletized using a pelletizer to obtain pellets of the polycarbonate resin composition.

[Test Specimen Fabrication]

The resulting pellets were dried for 5 hours at 80° C. and were then injection molded using an injection molder (SE100DU from Sumitomo Heavy Industries, Ltd.) at a cylinder temperature of 280° C. and a mold temperature of 80° C. to mold a UL test-qualified test specimen having a length of 125 mm, a width of 13 mm, and a thickness of 1 mm.

A flat plate molding with a length of 100 mm, a width of 100 mm, and a thickness of 1 mm was also molded at a cylinder temperature of 300° C. and a mold temperature of 80° C.

In addition, pellets obtained as described above were dried for 5 hours at 80° C. and were then injection molded using an injection molder (Cycap M-2, 75 T clamping pressure, from Sumitomo Heavy Industries, Ltd.) at a cylinder temperature of 280° C. and a mold temperature of 80° C. to mold an ISO multipurpose test specimen (4 mm) and an ISO multipurpose test specimen (3 mm).

TABLE 10

| | | | examples | | | comparative example | reference examples | |
|---|---|---|---|---|---|---|---|---|
| | abbreviation | unit | 19 | 20 | 21 | 14 | 3 | 4 |
| composition | A1 | mass parts | 51.07 | 51.07 | 51.07 | 51.07 | 51.07 | 51.07 |
| | B2 | | 30 | 20 | 30 | 30 | | |
| | B3 | | 10 | 20 | | 10 | 40 | |
| | B4 | | | | 10 | | | 40 |
| | C | | 8 | 8 | 8 | | 8 | 8 |
| | D | | 0.4 | 0.4 | 0.4 | 0.4 | 0.4 | 0.4 |
| | G1 | | 0.03 | 0.03 | 0.03 | 0.03 | 0.03 | 0.03 |
| | G3 | | 0.5 | 0.5 | 0.5 | 0.5 | 0.5 | 0.5 |
| | H | | | | | 8 | | |
| flame retardancy (1 mmt) | | | V-0 | V-0 | V-0 | V-1 | V-0 | V-2 |
| modulus of elasticity | | GPa | 11.3 | 10.1 | 11.5 | 11.5 | 11.8 | 10 |
| warping resistance | | | 0.73 | 0.81 | 0.76 | 0.74 | 0.61 | 0.9 |
| impact resistance | | kJ/m² | 15.8 | 12.1 | 16 | 8.6 | 17.1 | 7.6 |
| heat resistance | | ° C. | 114 | 113 | 114 | 108 | 114 | 111 |

As shown in the examples in Table 10, the resin compositions of Examples 19 to 21, comprising polycarbonate, glass fiber and glass flake, phosphazene, and fluoropolymer, are demonstrated to have an excellent balance among the flame retardancy, rigidity, impact resistance, warping resistance, and heat resistance.

When, on the other hand, Comparative Example 14 is considered, the flame retardancy, impact resistance, and heat resistance are shown to deteriorate when a phosphate ester is used for the flame retardant in place of the phosphazene.

<Invention Examples of Compositions Formed of Polycarbonate/Flat Cross-section Glass Fiber/Phosphazene/Fluoropolymer>

[Production of Resin Pellets]

The flat cross-section glass fiber and styrenic resin described in Table 11 below were used, while the components described above were otherwise used.

TABLE 11

| | abbreviation | |
|---|---|---|
| flat cross-section glass fiber | B5 | 28 μm major diameter, 7 μm minor diameter, ratio between major diameter and minor diameter: 4, from Nitto Boseki Co., Ltd., product name: CSG 3PA-820, urethane sizing agent |
| | B6 | 28 μm major diameter, 7 μm minor diameter, ratio between major diameter and minor diameter: 4, from Nitto Boseki Co., Ltd., product name: CSG 3PA-830, urethane/epoxy sizing agent |
| | B7 | 28 μm major diameter, 7 μm minor diameter, ratio between major diameter and minor diameter: 4, from Nitto Boseki Co., Ltd., product name: CSG 3PA-831, epoxy sizing agent |

TABLE 11-continued

| | abbreviation | |
|---|---|---|
| | B8 | 20 μm major diameter, 10 μm minor diameter, ratio between major diameter and minor diameter: 2, from Nitto Boseki Co., Ltd., product name: CSG 3PL-830, urethane/epoxy sizing agent |
| | B9 | 20 μm major diameter, 10 μm minor diameter, ratio between major diameter and minor diameter: 2, from Nitto Boseki Co., Ltd., product name: CSG 3PL-822, urethane sizing agent |
| styrenic resin | F1 | AS resin, from Techno Polymer Co., Ltd., product name: 290FF |

[Production of Resin Pellets]

The components indicated in Tables 12 to 14 below, with the exception of the flat cross-section glass fiber and glass fiber, were combined in the proportions (mass ratios) given in Tables 12 to 14 and were mixed for 20 minutes with a tumbler and then fed from an upstream feeder to a twin-screw extruder equipped with 1 vent (TEX30HSST from The Japan Steel Works, Ltd.). While the flat cross-section glass fiber and glass fiber were being fed in the middle of the barrel from a side feeder, mixing was performed at 200 rpm at a barrel temperature of 280° C. and a discharge rate of 15 kg/hour. The molten resin extruded in strand form was quenched in a water tank and pelletized using a pelletizer to obtain pellets of the polycarbonate resin composition.

[Test Specimen Fabrication]

The resulting pellets were dried for 5 hours at 80° C. and were then injection molded using an injection molder (SE100DU from Sumitomo Heavy Industries, Ltd.) at a cylinder temperature of 280° C. and a mold temperature of 80° C. to mold a UL test-qualified test specimen having a length of 125 mm, a width of 13 mm, and a thickness of 0.8 mm.

A flat plate molding with a length of 100 mm, a width of 100 mm, and a thickness of 1 mm was also molded at a cylinder temperature of 300° C. and a mold temperature of 80° C.

Similarly, pellets obtained by the above-described production method were dried for 5 hours at 80° C. and were then injection molded using an injection molder (Cycap M-2, 75 T clamping pressure, from Sumitomo Heavy Industries, Ltd.) at a cylinder temperature of 280° C. and a mold temperature of 80° C. to mold an ISO multipurpose test specimen (4 mm) and an ISO multipurpose test specimen (3 mm).

[The Flowability]

The flowability was evaluated using the following method.

The pellets obtained as described above were dried for 5 hours at 80° C. and were then injection molded using an injection molder (Cycap M-2, 75 T clamping pressure, from Sumitomo Heavy Industries, Ltd.) at a cylinder temperature of 300° C., a mold temperature of 80° C., and an injection pressure of 150 MPa: the bar-flow flow length (unit: mm) for a thickness of 1 mm and a width of 20 mm was measured and the average value for 10 shots was calculated. A larger value here is indicative of a better flowability and is thus preferred. This is reported in the tables as the "flowability".

TABLE 12

| | | | examples | | | | | |
|---|---|---|---|---|---|---|---|---|
| | abbreviation | unit | 22 | 23 | 24 | 25 | 26 | 27 |
| composition | A1 | mass | 81.17 | 71.17 | 61.17 | 51.17 | 51.17 | 49.17 |
| | B5 | parts | 10 | 20 | 30 | 40 | | |
| | B6 | | | | | | 40 | 40 |
| | B7 | | | | | | | |
| | B8 | | | | | | | |
| | B9 | | | | | | | |
| | C | | 8 | 8 | 8 | 8 | 8 | 10 |
| | D | | 0.25 | 0.25 | 0.25 | 0.25 | 0.25 | 0.25 |
| | E | | | | | | | |
| | F | | | | | | | |
| | F1 | | | | | | | |
| | G1 | | 0.03 | 0.03 | 0.03 | 0.03 | 0.03 | 0.03 |
| | G2 | | 0.05 | 0.05 | 0.05 | 0.05 | 0.05 | 0.05 |
| | G3 | | 0.5 | 0.5 | 0.5 | 0.5 | 0.5 | 0.5 |
| | H | | | | | | | |
| | B2 | | | | | | | |
| flame retardancy (0.8 mmt) | | | V-0 | V-0 | V-0 | V-0 | V-0 | V-0 |
| flowability | | mm | 205 | 185 | 160 | 150 | 140 | 170 |
| modulus of elasticity | | GPa | 4 | 6.1 | 8.3 | 11.7 | 11.7 | 11.8 |
| warping resistance | | | 0.82 | 0.68 | 0.63 | 0.7 | 0.67 | 0.71 |
| impact resistance | | kJ/m$^2$ | 14.1 | 18.4 | 17.1 | 16.5 | 18 | 17.8 |
| heat resistance | | ° C. | 113 | 114 | 112 | 109 | 115 | 109 |

TABLE 13

| | | | examples | | | | | | | |
|---|---|---|---|---|---|---|---|---|---|---|
| | abbreviation | unit | 28 | 29 | 30 | 31 | 32 | 33 | 34 | 35 |
| composition | A1 | mass | 47.17 | 49.17 | 44.17 | 42.17 | 48.17 | 46.17 | 46.17 | 51.17 |
| | B5 | parts | | | | | | | | |
| | B6 | | 40 | | 40 | 40 | 40 | 40 | | |
| | B7 | | | 40 | | | | | | |
| | B8 | | | | | | | | 40 | |

TABLE 13-continued

|  |  | examples |  |  |  |  |  |  |  |
|---|---|---|---|---|---|---|---|---|---|
| abbreviation | unit | 28 | 29 | 30 | 31 | 32 | 33 | 34 | 35 |
| B9 |  |  |  |  |  |  |  |  | 40 |
| C |  | 12 | 10 | 12 | 12 | 8 | 8 | 8 | 8 |
| D |  | 0.25 | 0.25 | 0.25 | 0.25 | 0.25 | 0.25 | 0.25 | 0.25 |
| E |  |  |  | 3 |  |  |  |  |  |
| F |  |  |  |  | 5 |  |  |  |  |
| F1 |  |  |  |  |  | 3 | 5 | 5 |  |
| G1 |  | 0.03 | 0.03 | 0.03 | 0.03 | 0.03 | 0.03 | 0.03 | 0.03 |
| G2 |  | 0.05 | 0.05 | 0.05 | 0.05 | 0.05 | 0.05 | 0.05 | 0.05 |
| G3 |  | 0.5 | 0.5 | 0.5 | 0.5 | 0.5 | 0.5 | 0.5 | 0.5 |
| H |  |  |  |  |  |  |  |  |  |
| B2 |  |  |  |  |  |  |  |  |  |
| flame retardancy (0.8 mmt) |  | V-0 | V-0 | V-0 | V-0 | V-0 | V-0 | V-0 | V-0 |
| flowability | mm | 195 | 170 | 190 | 185 | 175 | 185 | 180 | 150 |
| modulus of elasticity | GPa | 11.2 | 12 | 11.3 | 11.1 | 12 | 11.9 | 11.3 | 11.4 |
| warping resistance |  | 0.7 | 0.71 | 0.69 | 0.67 | 0.71 | 0.72 | 0.66 | 0.65 |
| impact resistance | kJ/m$^2$ | 13.5 | 18.5 | 15.5 | 15.1 | 17.8 | 18.2 | 13.6 | 14.5 |
| heat resistance | °C. | 104 | 111 | 102 | 101 | 112 | 114 | 111 | 114 |

TABLE 14

|  |  |  | comparative examples |  |  |  | reference examples |  |
|---|---|---|---|---|---|---|---|---|
|  | abbreviation | unit | 15 | 16 | 17 | 18 | 5 | 6 |
| composition | A1 | mass | 81.17 | 71.17 | 61.17 | 51.17 | 81.17 | 51.17 |
|  | B5 | parts | 10 | 20 | 30 | 40 |  |  |
|  | B6 |  |  |  |  |  |  |  |
|  | B7 |  |  |  |  |  |  |  |
|  | B8 |  |  |  |  |  |  |  |
|  | B9 |  |  |  |  |  |  |  |
|  | C |  |  |  |  |  | 8 | 8 |
|  | D |  | 0.25 | 0.25 | 0.25 | 0.25 | 0.25 | 0.25 |
|  | E |  |  |  |  |  |  |  |
|  | F |  |  |  |  |  |  |  |
|  | F1 |  |  |  |  |  |  |  |
|  | G1 |  | 0.03 | 0.03 | 0.03 | 0.03 | 0.03 | 0.03 |
|  | G2 |  | 0.05 | 0.05 | 0.05 | 0.05 | 0.05 | 0.05 |
|  | G3 |  | 0.5 | 0.5 | 0.5 | 0.5 | 0.5 | 0.5 |
|  | H |  | 8 | 8 | 8 | 8 |  |  |
|  | B2 |  |  |  |  |  | 10 | 40 |
| flame retardancy (0.8 mmt) |  |  | V-2 | V-2 | V-2 | V-2 | V-0 | V-0 |
| flowability |  | mm | 210 | 190 | 175 | 155 | 170 | 115 |
| modulus of elasticity |  | GPa | 3.7 | 5.5 | 8.1 | 10.8 | 3.8 | 11 |
| warping resistance |  |  | 0.79 | 0.6 | 0.51 | 0.6 | 0.81 | 0.68 |
| impact resistance |  | kJ/m$^2$ | 9.2 | 12.3 | 11.1 | 9.5 | 10.1 | 12.1 |
| heat resistance |  | °C. | 107 | 108 | 107 | 105 | 112 | 109 |

As shown in the examples in Tables 12 and 13, the resin compositions of the present invention, comprising polycarbonate, flat cross-section glass fiber, phosphazene, and fluoropolymer, are demonstrated to have an excellent balance among the flame retardancy, flowability, rigidity, impact resistance, warping resistance, and heat resistance.

When, on the other hand, the comparative examples in Table 14 are considered, the flame retardancy, impact resistance, and heat resistance deteriorate when a phosphate ester is used for the flame retardant in place of the phosphazene (Comparative Examples 15 to 18).

<Invention Examples of Compositions Formed of Polycarbonate/Flat Cross-section Glass and Glass Flake/Phosphazene/Fluoropolymer>

[Production of Resin Pellets]

The flat cross-section glass fiber and glass flake described in Table 15 below, which were also used in the preceding, were used, while the components described above were otherwise used.

TABLE 15

| abbreviation |  |  |
|---|---|---|
| flat cross-section glass fiber | B6 | 28 μm major diameter, 7 μm minor diameter, ratio between major diameter and minor diameter: 4, from Nitto Boseki Co., Ltd., product name: CSG 3PA-830, urethane/epoxy sizing agent |
|  | B9 | 20 μm major diameter, 10 μm minor diameter, ratio between major diameter and minor diameter: 2, from Nitto Boseki Co., Ltd., product name: CSG 3PL-822, urethane sizing agent |

TABLE 15-continued

| | abbreviation | |
|---|---|---|
| glass flake | B3 | glass flake with an average thickness of 5 μm and an average particle size of 600 μm, from Nippon Sheet Glass Co., Ltd., product name: Fleka REFG101 |
| | B4 | glass flake with an average thickness of 0.7 μm and an average particle size of 160 μm, from Nippon Sheet Glass Co., Ltd., product name: Fleka MEG160FYX |

[Production of Resin Pellets]

The components indicated in Tables 16 to 17 below, with the exception of the flat cross-section glass fiber, glass fiber, and glass flake, were combined in the proportions (mass ratios) given in Tables 16 to 17 and were mixed for 20 minutes with a tumbler and then fed from an upstream feeder to a twin-screw extruder equipped with 1 vent (TEX30HSST from The Japan Steel Works, Ltd.). While the flat cross-section glass fiber, glass fiber, and glass flake were being fed in the middle of the barrel from a side feeder, mixing was performed at 200 rpm at a barrel temperature of 280° C. and a discharge rate of 20 kg/hour. The molten resin extruded in strand form was quenched in a water tank and pelletized using a pelletizer to obtain pellets of the polycarbonate resin composition.

[Test Specimen Fabrication]

The resulting pellets were dried for 5 hours at 80° C. and were then injection molded using an injection molder (SE100DU from Sumitomo Heavy Industries, Ltd.) at a cylinder temperature of 280° C. and a mold temperature of 80° C. to mold a UL test-qualified test specimen having a length of 125 mm, a width of 13 mm, and a thickness of 1 mm.

A flat plate molding with a length of 100 mm, a width of 100 mm, and a thickness of 1 mm was also molded at a cylinder temperature of 300° C. and a mold temperature of 80° C.

Similarly, pellets obtained as described above were dried for 5 hours at 80° C. and were then injection molded using an injection molder (Cycap M-2, 75 T clamping pressure, from Sumitomo Heavy Industries, Ltd.) at a cylinder temperature of 280° C. and a mold temperature of 80° C. to mold an ISO multipurpose test specimen (4 mm) and an ISO multipurpose test specimen (3 mm).

TABLE 16

| | | | examples | | | | | |
|---|---|---|---|---|---|---|---|---|
| | abbreviation | unit | 36 | 37 | 38 | 39 | 40 | 41 |
| composition | A1 | mass | 51.02 | 51.02 | 41.02 | 52.02 | 51.02 | 51.02 |
| | B6 | parts | 30 | 30 | 35 | 20 | | |
| | B9 | | | | | | 30 | 20 |
| | B3 | | 10 | | 15 | 20 | 10 | 20 |
| | B4 | | | 10 | | | | |
| | C | | 8 | 8 | 8 | 11 | 8 | 8 |
| | D | | 0.4 | 0.4 | 0.4 | 0.4 | 0.4 | 0.4 |
| | F1 | | | | | | 5 | 5 |
| | G1 | | 0.03 | 0.03 | 0.03 | 0.03 | 0.03 | 0.03 |
| | G2 | | 0.05 | 0.05 | 0.05 | 0.05 | 0.05 | 0.05 |
| | G3 | | 0.5 | 0.5 | 0.5 | 0.5 | 0.5 | 0.5 |
| | H | | | | | | | |
| | B2 | | | | | | | |
| flame retardancy (1 mmt) | | | V-0 | V-0 | V-0 | V-0 | V-0 | V-0 |
| modulus of elasticity | | GPa | 12.2 | 12.4 | 13.5 | 11.2 | 11.6 | 10.5 |
| warping resistance | | | 0.75 | 0.74 | 0.79 | 0.81 | 0.73 | 0.8 |
| impact resistance | | kJ/m$^2$ | 15 | 16 | 16 | 13 | 14 | 12 |
| heat resistance | | ° C. | 113 | 113 | 113 | 107 | 111 | 111 |

TABLE 17

| | abbreviation | unit | reference example 7 | reference example 8 | comparative example 19 | reference example 9 |
|---|---|---|---|---|---|---|
| composition | A1 | mass | 81.17 | 71.17 | 61.17 | 51.17 |
| | B6 | parts | 30 | 40 | 30 | |
| | B9 | | | | | |
| | B3 | | | | 10 | 10 |
| | B4 | | | | | |
| | C | | 8 | 8 | | 8 |
| | D | | 0.4 | 0.4 | 0.4 | 0.4 |
| | F1 | | | | | |
| | G1 | | 0.03 | 0.03 | 0.03 | 0.03 |
| | G2 | | 0.05 | 0.05 | 0.05 | 0.05 |
| | G3 | | 0.5 | 0.5 | 0.5 | 0.5 |
| | H | | | | | 8 |
| | B2 | | | | | 30 |
| flame retardancy (1 mmt) | | | V-0 | V-0 | V-1 | V-0 |
| modulus of elasticity | | GPa | 8.2 | 11.5 | 12.4 | 11.4 |
| warping resistance | | | 0.63 | 0.69 | 0.73 | 0.72 |
| impact resistance | | kJ/m$^2$ | 16 | 16 | 9 | 14 |
| heat resistance | | ° C. | 112 | 109 | 104 | 112 |

As shown in the examples in the preceding table, the resin compositions of Examples 36 to 41, comprising polycarbonate, flat cross-section glass fiber and glass flake, phosphazene, and fluoropolymer, are demonstrated to have an excellent balance among the flame retardancy, rigidity, warping resistance, impact resistance, and heat resistance.

When, on the other hand, Comparative Example 19 is considered, the flame retardancy, impact resistance, and heat resistance are shown to deteriorate when a phosphate ester is used for the flame retardant in place of the phosphazene.

<Invention Examples of Compositions Formed of Polycarbonate/Flat Cross-section Glass Fiber and Carbon Fiber/Phosphazene/Fluoropolymer>

The flat cross-section glass fiber, carbon fiber, and (circular cross-section) glass fiber described in Table 18 below were used.

TABLE 18

| | abbreviation | |
|---|---|---|
| flat cross-section glass fiber | B6 | chopped glass fiber with a 28 μm major diameter, 7 μm minor diameter, ratio between major diameter and minor diameter: 4, from Nitto Boseki Co., Ltd., product name: CSG 3PA-830, urethane/epoxy sizing agent |
| | B8 | chopped glass fiber with a 20 μm major diameter, 10 μm minor diameter, ratio between major diameter and minor diameter: 2, from Nitto Boseki Co., Ltd., product name: CSG 3PL-830, urethane/epoxy sizing agent |
| | B9 | chopped glass fiber with a 20 μm major diameter, 10 μm minor diameter, ratio between major diameter and minor diameter: 2, from Nitto Boseki Co., Ltd., product name: CSG 3PL-822, urethane sizing agent |
| carbon fiber | CF2 | chopped carbon fiber with a cut length of 6 mm, from Mitsubishi Rayon Co., Ltd., product name: Pyrofil TR-066A |
| | CF1 | chopped carbon fiber with a cut length of 6 mm, from Mitsubishi Rayon Co., Ltd., product name: Pyrofil TR-06U |
| | CF3 | chopped carbon fiber with a cut length of 6 mm, from Mitsubishi Rayon Co., Ltd., product name: Pyrofil TR-06UL |
| circular cross-section glass fiber | B2 | chopped glass fiber with a diameter of 10 μm and a cut length of 3 mm, from Nippon Electric Glass Co., Ltd., product name: ECS03T-187H, flattening ratio on the fiber cross section: 1 to 1.1 |

[Production of Resin Pellets]

The components indicated in Tables 19 and 20 below, with the exception of the glass fiber, flat cross-section glass fiber, and carbon fiber, were combined in the proportions (mass ratios) given in Tables 19 and 20 and were mixed for 20 minutes with a tumbler and then fed from an upstream feeder to a twin-screw extruder equipped with 1 vent (TEX30HSST from The Japan Steel Works, Ltd.). While the glass fiber, flat cross-section glass fiber, and carbon fiber were being fed in the middle of the barrel from a side feeder, mixing was performed at 200 rpm at a barrel temperature of 280° C. and a discharge rate of 15 kg/hour. The molten resin extruded in strand form was quenched in a water tank and pelletized using a pelletizer to obtain pellets of the polycarbonate resin composition.

[Test Specimen Fabrication]

The resulting pellets were dried for 5 hours at 80° C. and were then injection molded using an injection molder (SE100DU from Sumitomo Heavy Industries, Ltd.) at a cylinder temperature of 280° C. and a mold temperature of 80° C. to mold a UL test-qualified test specimen having a length of 125 mm, a width of 13 mm, and a thickness of 0.8 mm.

Similarly, pellets obtained as described above were dried for 5 hours at 80° C. and were then injection molded using an injection molder (Cycap M-2, 75 T clamping pressure, from Sumitomo Heavy Industries, Ltd.) at a cylinder temperature of 280° C. and a mold temperature of 80° C. to mold an ISO multipurpose test specimen (4 mm) and an ISO multipurpose test specimen (3 mm).

The flowability was evaluated as has been described above.

TABLE 19

| | | | examples | | | | | | | | |
|---|---|---|---|---|---|---|---|---|---|---|---|
| | abbreviation | unit | 42 | 43 | 44 | 45 | 46 | 47 | 48 | 49 | 50 |
| composition | A1 | mass parts | 57.3 | | | | 56.3 | 49.3 | | | |
| | A2 | | | 61.3 | 59.3 | 57.3 | | | 51.4 | 54.4 | 51.4 |
| | B6 | | 20 | 20 | 20 | 20 | 10 | 10 | | | |
| | B8 | | | | | | | | 10 | | 10 |
| | B9 | | | | | | | | | 10 | |
| | CF2 | | 10 | 10 | 10 | 10 | 20 | 25 | | | |
| | CF1 | | | | | | | | 25 | | |
| | CF3 | | | | | | | | | 25 | 25 |
| | B2 | | | | | | | | | | |
| | C | | 12 | 8 | 10 | 12 | 10 | 10 | 8 | 10 | 8 |
| | D | | 0.5 | 0.5 | 0.5 | 0.5 | 0.5 | 0.5 | 0.4 | 0.4 | 0.4 |
| | E | | | | | | 3 | | | | |
| | F | | | | | | | 5 | | | |
| | F1 | | | | | | | | 5 | | 5 |
| | G1 | | 0.03 | 0.03 | 0.03 | 0.03 | 0.03 | 0.03 | 0.03 | 0.03 | 0.03 |
| | G2 | | 0.05 | 0.05 | 0.05 | 0.05 | 0.05 | 0.05 | 0.05 | 0.05 | 0.05 |
| | G4 | | 0.15 | 0.15 | 0.15 | 0.15 | 0.15 | 0.15 | 0.15 | 0.15 | 0.15 |
| | H | | | | | | | | | | |
| flame retardancy (0.8 mmt) | | | V-0 | V-0 | V-0 | V-0 | V-0 | V-0 | V-0 | V-0 | V-0 |
| flowability | | mm | 125 | 125 | 150 | 155 | 120 | 115 | 150 | 150 | 150 |
| modulus of elasticity | | GPa | 13 | 13.1 | 13 | 13.2 | 16.1 | 17.2 | 15.3 | 15.2 | 15 |
| impact resistance | | kJ/m$^2$ | 9.8 | 9.8 | 10.2 | 9.6 | 8.9 | 7.7 | 10 | 11.2 | 10.1 |
| heat resistance | | ° C. | 104 | 113 | 106 | 102 | 105 | 104 | 112 | 107 | 112 |

TABLE 20

| | abbreviation | unit | reference example 10 | comparative example 20 | reference example 11 | reference example 12 |
|---|---|---|---|---|---|---|
| composition | A1 | mass parts | 57.27 | 57.27 | 47.27 | 67.27 |
| | A2 | | | | | |
| | B6 | | | 20 | 40 | |
| | CF2 | | 10 | 10 | | 20 |
| | B2 | | 20 | | | |
| | C | | 12 | | 12 | 12 |
| | D | | 0.5 | 0.5 | 0.5 | 0.5 |
| | E | | | | | |
| | F | | | | | |
| | G1 | | 0.03 | 0.03 | 0.03 | 0.03 |
| | G2 | | 0.05 | 0.05 | 0.05 | 0.05 |
| | G4 | | 0.15 | 0.15 | 0.15 | 0.15 |
| | H | | | 12 | | |
| flame retardancy (0.8 mmt) | | | V-0 | V-2 | V-0 | V-0 |
| flowability | | mm | 110 | 165 | 155 | 105 |
| modulus of elasticity | | GPa | 13.8 | 15.1 | 11.6 | 13 |
| impact resistance | | kJ/m² | 9 | 5.9 | 15.7 | 6.6 |
| heat resistance | | °C. | 102 | 99 | 105 | 107 |

As shown in the examples in Table 19, the resin compositions of the present invention, comprising polycarbonate, flat cross-section glass fiber, carbon fiber, phosphazene, and fluoropolymer, are demonstrated to have an excellent flame retardancy, rigidity, impact resistance, and heat resistance.

When, on the other hand, the comparative examples in Table 20 are considered, the flame retardancy is demonstrated to deteriorate when a phosphate ester is used for the flame retardant in place of the phosphazene (Comparative Example 20).

<Invention Examples of Compositions Formed of Polycarbonate/Milled Glass Fiber (Glass Short Fiber)/Phosphazene/Fluoropolymer>

The milled glass fiber (glass short fiber), elastomer, and release agent described in Table 21 below were used, while the components described above were otherwise used.

TABLE 21

| | abbreviation | |
|---|---|---|
| glass short fiber | B10 | glass short fiber with a 10 μm fiber diameter, 90 μm fiber length, and a ratio for the average fiber diameter: 9, from Asahi Fiber Glass Co., Ltd., product name: JB1-20 |
| | B11 | glass short fiber with a 10 μm fiber diameter, 50 μm fiber length, and a ratio for the average fiber diameter: 5, from Asahi Fiber Glass Co., Ltd., product name: MF-S-R |
| elastomer | E1 | graft copolymer obtained by the graft copolymerization of an alkyl (meth) acrylate polymer on a rubbery polymer composed of a crosslinked butadiene-type polymer, from the Kaneka Corporation, product name: Kane Ace M711 |
| | E2 | graft copolymer obtained by the graft copolymerization of acrylonitrile and styrenic polymer on a polyorganosiloxane-type rubbery polymer, from Mitsubishi Rayon Co., Ltd., product name: Metablen SRK200 |
| | E3 | graft copolymer obtained by the graft copolymerization of acrylonitrile and styrenic polymer on a polyorganosiloxane-type rubbery polymer, from Mitsubishi Rayon Co., Ltd., product name: Metablen S2030 |
| release agent | G5 | release agent, pentaerythritol tetrastearate, from Cognis Japan Ltd., product name:VPG861 |

[Production of Resin Pellets]

The components indicated in Tables 22 and 23 below were combined in the proportions (mass ratios) given in Tables 22 and 23 and were mixed for 20 minutes with a tumbler and then fed from a feeder to a twin-screw extruder equipped with 1 vent (TEX30HSST from The Japan Steel Works, Ltd.). Mixing was performed at 200 rpm at a barrel temperature of 260° C. and a discharge rate of 15 kg/hour. The molten resin extruded in strand form was quenched in a water tank and pelletized using a pelletizer to obtain pellets of the polycarbonate resin composition.

[Test Specimen Fabrication]

The resulting pellets were dried for 5 hours at 80° C. and were then injection molded using an injection molder (SE100DU from Sumitomo Heavy Industries, Ltd.) at a cylinder temperature of 260° C. and a mold temperature of 80° C. to mold a UL test-qualified test specimen having a length of 125 mm, a width of 13 mm, and a thickness of 0.8 mm.

Similarly, pellets obtained by the above-described production method were dried for 5 hours at 80° C. and were then injection molded using an injection molder (Cycap M-2, 75 T clamping pressure, from Sumitomo Heavy Industries, Ltd.) at a cylinder temperature of 280° C. and a mold temperature of 80° C. to mold an ISO multipurpose test specimen (4 mm) and an ISO multipurpose test specimen (3 mm).

For the impact resistance, the notched and unnotched Charpy impact strengths were measured in accordance with ISO 179 using the ISO multipurpose test specimen (3 mmt) prepared as described above.

[Wet Heat Stability]

The wet heat stability was evaluated by the following method.

The nominal strain at break ("initial NS") was measured in conformity to ISO 527 using the ISO multipurpose test specimen (4 mmt) obtained as described above.

The nominal strain at break ("500h NS") was similarly measured by the indicated method after an ISO multipurpose test specimen (4 mmt) had been treated for 500 hours at a temperature of 70° C. and a relative humidity of 90% using a thermostat/humidistat. The wet heat stability was evaluated by determining the nominal strain at break retention ratio [(500h NS)/(initial NS)×100] (unit: %) after the test. A larger value here indicates a better wet heat stability. This is reported as the "wet heat stability" in the tables.

TABLE 22

| | abbreviation | unit | examples 51 | 52 | 53 | 54 | 55 |
|---|---|---|---|---|---|---|---|
| composition | A | mass parts | 79.35 | 81.35 | 79.35 | 79.35 | 72.75 |
| | B10 | | 10 | | | | |
| | B11 | | | 10 | 10 | 10 | 12 |
| | C | | 8 | 6 | 8 | 8 | 10 |
| | D | | 0.4 | 0.4 | 0.4 | 0.4 | 0.4 |
| | E1 | | 2 | | | | |
| | E2 | | | 2 | 2 | | |
| | E3 | | | | | 2 | 5 |
| | G5 | | 0.25 | 0.25 | 0.25 | 0.25 | 0.25 |
| | H | | | | | | |
| flame retardancy (0.8 mmt) | | | V-0 | V-0 | V-0 | V-0 | V-0 |
| flexural modulus | | MPa | 2.8 | 3.0 | 3.0 | 3.0 | 3.3 |
| Charpy impact strength | | | | | | | |
| notched | | kJ/m² | 9.4 | 9.8 | 9.4 | 9.8 | 10 |
| unnotched | | kJ/m² | 232 | 245 | 240 | 242 | 272 |
| heat resistance | | °C. | 114 | 119 | 113 | 114 | 110 |
| wet heat stability | | % | 82 | 88 | 72 | 75 | 66 |

TABLE 23

| | abbreviation | unit | comparative examples 21 | 22 | 23 |
|---|---|---|---|---|---|
| composition | A | mass parts | 79.35 | 81.35 | 79.35 |
| | B10 | | 10 | | |
| | B11 | | | 10 | 10 |
| | C | | | | |
| | D | | 0.4 | 0.4 | 0.4 |
| | E1 | | 2 | | |
| | E2 | | | 2 | 2 |
| | E3 | | | | |
| | G5 | | 0.25 | 0.25 | 0.25 |
| | H | | 8 | 6 | 8 |
| flame retardancy (0.8 mmt) | | | V-2 | V-2 | V-2 |
| flexural modulus | | MPa | 2.8 | 3.0 | 2.9 |
| Charpy impact strength | | | | | |
| notched | | kJ/m² | 7.4 | 9.2 | 8.2 |
| unnotched | | kJ/m² | 202 | 220 | 204 |
| heat resistance | | °C. | 103 | 107 | 103 |
| wet heat stability | | % | 48 | 52 | 38 |

As shown in the examples in Table 22, the resin compositions of the present invention, comprising polycarbonate, milled glass fiber (glass short fiber), phosphazene, and fluoropolymer, are demonstrated to have an excellent flame retardancy, rigidity, impact resistance, heat resistance, and wet heat stability.

When, on the other hand, the comparative examples in Table 23 are considered, the flame retardancy, impact resistance, heat resistance, and wet heat stability deteriorate when a phosphate ester is used for the flame retardant in place of the phosphazene (Comparative Examples 21 to 23).

<Invention Examples of Compositions Formed of Polycarbonate/Glass Beads/Phosphazene/Fluoropolymer>

The glass beads described in Table 24 below were used, while the components described above were otherwise used.

TABLE 24

| | abbreviation | |
|---|---|---|
| glass beads | B12 | glass beads with an average particle diameter of 20 μm, from Potters-Ballotini Co., Ltd., product name: EGB731B-PN |

[Production of Resin Pellets]

The components indicated in Tables 25 and 26 below were combined in the proportions (mass ratios) given in Tables 25 and 26 and were mixed for 20 minutes with a tumbler and then fed from an upstream feeder to a twin-screw extruder equipped with 1 vent (TEX30HSST from The Japan Steel Works, Ltd.). Mixing was performed at 200 rpm at a barrel temperature of 280° C. and a discharge rate of 15 kg/hour. The molten resin extruded in strand form was quenched in a water tank and pelletized using a pelletizer to obtain pellets of the polycarbonate resin composition.

[Test Specimen Fabrication]

The resulting pellets were dried for 5 hours at 80° C. and were then injection molded using an injection molder (SE100DU from Sumitomo Heavy Industries, Ltd.) at a cylinder temperature of 280° C. and a mold temperature of 80° C. to mold a UL test-qualified test specimen having a length of 125 mm, a width of 13 mm, and a thickness of 1.2 mm.

A flat plate test specimen with a length of 100 mm, a width of 100 mm, and a thickness of 2 mm was also molded by the same procedure.

Similarly, pellets obtained by the above-described method were dried for 5 hours at 80° C. and were then injection molded using an injection molder (Cycap M-2, 75 T clamping pressure, from Sumitomo Heavy Industries, Ltd.) at a cylinder temperature of 280° C. and a mold temperature of 80° C. to mold an ISO multipurpose test specimen (3 mm) and an ISO multipurpose test specimen (4 mm).

[Impact Resistance]

The impact resistance was evaluated by measuring the unnotched Charpy in accordance with ISO 179-2 using the ISO multipurpose test specimen (4 mmt) obtained by the method described above.

[Scratching Resistance]

A pencil hardness test was carried out in conformity to JIS K 5400 on the flat plate test specimen yielded by the method described above. A "○" was assigned when the pencil hardness was HB or higher, while an "×" was assigned when HB was not satisfied.

TABLE 25

|  | abbreviation | unit | examples 56 | 57 | 58 | 59 | 60 |
|---|---|---|---|---|---|---|---|
| composition | A | mass | 77.27 | 69.27 | 66.27 | 64.27 | 54.27 |
|  | B12 | parts | 10 | 20 | 20 | 20 | 30 |
|  | C |  | 12 | 10 | 10 | 12 | 12 |
|  | D |  | 0.4 | 0.4 | 0.4 | 0.4 | 0.4 |
|  | E |  |  |  | 3 |  |  |
|  | E2 |  |  |  |  | 3 | 3 |
|  | G1 |  | 0.03 | 0.03 | 0.03 | 0.03 | 0.03 |
|  | G4 |  | 0.3 | 0.3 | 0.3 | 0.3 | 0.3 |
|  | H |  |  |  |  |  |  |
| flame retardancy (1.2 mmt) |  |  | V-0 | V-0 | V-0 | V-0 | V-0 |
| impact resistance (unnotched) |  | kJ/m$^2$ | 85 | 101 | 93 | 96 | 71 |
| heat resistance |  | °C. | 104 | 106 | 105 | 103 | 104 |
| scratching resistance |  |  | ○ | ○ | ○ | ○ | ○ |

TABLE 26

|  | abbreviation | unit | comparative examples 24 | 25 | 26 | 27 | 28 |
|---|---|---|---|---|---|---|---|
| composition | A | mass | 77.27 | 67.27 | 64.27 | 47.67 | 87.52 |
|  | B12 | parts | 10 | 20 | 20 | 40 |  |
|  | C |  |  |  |  |  | 12 |
|  | D |  | 0.4 | 0.4 | 0.4 | 0.25 | 0.4 |
|  | E |  |  |  | 3 |  |  |
|  | E2 |  |  |  |  |  |  |
|  | G1 |  | 0.03 | 0.03 | 0.03 | 0.03 | 0.03 |
|  | G4 |  | 0.3 | 0.3 | 0.3 | 0.05 | 0.05 |
|  | H |  | 12 | 12 | 12 | 12 |  |
| flame retardancy (1.2 mmt) |  |  | V-2 | V-2 | V-2 | V-2 | V-0 |
| impact resistance (unnotched) |  | kJ/m$^2$ | 81 | 72 | 65 | 42 | — |
| heat resistance |  | °C. | 85 | 86 | 85 | 86 | — |
| scratching resistance |  |  | ○ | ○ | ○ | ○ | X |

As shown in the examples in Table 25, the resin compositions of the present invention, comprising polycarbonate, glass beads, phosphazene, and fluoropolymer, are demonstrated to have an excellent flame retardancy, impact resistance, heat resistance, and scratching resistance.

When, on the other hand, the comparative examples in Table 26 are considered, the flame retardancy, impact resistance, and heat resistance are shown to deteriorate when a phosphate ester is used for the flame retardant in place of the phosphazene. The scratching resistance is also shown to deteriorate when the glass beads are not incorporated (Comparative Example 28).

<Invention Examples of the Granular Phosphazene Compound that has a Percentage Retained on a Sieve with an Aperture of 400 μm of at Least 55 Mass % and that has a Bulk Density of 0.3 to 1.5 g/mL>

Example 61

Plate-shaped granules were obtained using a high compression roll-type granulator ("Compacting Machine MS" from Hosokawa-Micron) from a phenoxyphosphazene compound (from Fushimi Pharmaceutical Co., Ltd., product name: Rabitle FP-110, average particle diameter: 325 μm, bulk density: 0.62 g/mL, percentage retained on a sieve with an aperture of 400 μm: 21.5%). This was followed by pulverization using a pulverizer and then classification by screening to obtain a "granular phosphazene compound 1". This "granular phosphazene compound 1" had a bulk density of 0.63 g/mL and a percentage retained on a sieve with an aperture of 400 μm of 94.7%.

The percentage retained on a mesh sieve was determined as the percentage (mass %) remaining on the mesh after sieve classification by placing 100 g of the granular phosphazene compound sample on a sieve with an aperture of 400 μm (from Kansai Wire Netting Co., Ltd.) and shaking for 5 minutes using a sieve shaker (AS200 from Retsch).

For the bulk density, the static bulk density value was measured according to JIS K 7365 using a "Multitester MT-1001" from Seishin Enterprise Co., Ltd.

10 mass parts of the "granular phosphazene compound 1" was combined with 100 mass parts of an aromatic polycarbonate resin (from Mitsubishi Engineering-Plastics Corporation, product name: Iupilon (registered trademark) S-3000F) and mixing for 20 minutes with a tumbler was carried out followed by feeding to a twin-screw extruder equipped with 1 vent (TEX30HSST from The Japan Steel Works, Ltd.). Mixing was performed at a screw rotation rate of 250 rpm at a barrel temperature of 260° C. and a discharge rate of 15 kg/hour. Feeding was continued for 60 minutes, but sticking to the extruder screw was not seen and production could be carried out without problems.

Example 62

The same phenoxyphosphazene compound as used in Example 61 was granulated using a dry compression granulator ("Roll Press DP" from Seishin Enterprise Co., Ltd.) to obtain a "granular phosphazene compound 2". This "granular phosphazene compound 2" had a bulk density of 0.35 g/mL and a percentage retained on a sieve with an aperture of 400 μm of 88.1%.

Then, proceeding as in Example 61, the aromatic polycarbonate resin and the "granular phosphazene compound 2" were fed to the twin-screw extruder, and when this was done sticking to the extruder screw was not seen and production could be carried out without problems.

Example 63

The same phenoxyphosphazene compound as used in Example 61 was granulated using a fluidized rolling granulator ("New-Gra Machine" from Seishin Enterprise Co., Ltd.) and water as the binder to obtain a "granular phosphazene compound 3". This "granular phosphazene compound 3" had a bulk density of 0.70 g/mL and a percentage retained on a sieve with an aperture of 400 μm of 62.2%.

Then, proceeding as in Example 61, the aromatic polycarbonate resin and the "granular phosphazene compound 3" were fed to the twin-screw extruder, and when this was done sticking to the extruder screw was not seen and production could be carried out without problems.

Example 64

The "granular phosphazene compound 3" obtained in Example 63 was classified using a sieve with an aperture of 300 μm to obtain a "granular phosphazene compound 4". This "granular phosphazene compound 4" had a bulk density of 0.70 g/mL and a percentage retained on a sieve with an aperture of 400 μm of 86.4%.

Then, proceeding as in Example 61, the aromatic polycarbonate resin and the "granular phosphazene compound 4" were fed to the twin-screw extruder, and when this was done sticking to the extruder screw was not seen and production could be carried out without problems.

Comparative Example 29

10 mass parts of a phenoxyphosphazene compound (from Fushimi Pharmaceutical Co., Ltd., product name: Rabitle FP-110, average particle diameter: 325 μm, bulk density: 0.69 g/mL, percentage retained on a sieve with an aperture of 400 μm: 21.5%) was combined with 100 mass parts of the same aromatic polycarbonate resin as indicated above (Iupilon S-3000F) and mixing for 20 minutes with a tumbler was carried out followed by feeding to a twin-screw extruder equipped with 1 vent (TEX30HSST from The Japan Steel Works, Ltd.). Mixing was performed at a screw rotation rate of 250 rpm at a barrel temperature of 260° C. and a discharge rate of 10 kg/hour. While feeding was attempted for 60 minutes, sticking to the root of the screw was seen after 30 minutes and sticking to the extruder inlet port was also seen after 60 minutes and stable production could not be carried out.

<Invention Examples of the Granular Phosphazene Having a Bulk Density of 0.4 to 1.5 g/mL and in which (G) a Polycarbonate Resin Particulate Having a Percentage Passing a Sieve with an Aperture of 1000 μm of at Least 30 Mass %, is Mixed into a Phosphazene Compound (C) at a (C)/(G) Mass Ratio of 85/15 to 5/95>

The polycarbonate resin particulates (PC1) to (PC7) used in the examples and comparative examples are as indicated in Table 27 below.

Granular phosphazenes were produced using the granulation procedure A or B described below, and the granular phosphazene productivity, the disintegrability, the blendability, and the mixability were evaluated by the methods described below.

[Granulation Procedure A]

A phenoxyphosphazene compound (from Fushimi Pharmaceutical Co., Ltd., product name: Rabitle FP-110, average particle diameter: 325 μm, bulk density: 0.69 g/mL) and the polycarbonate resin particulate were combined in the proportions given in Tables 28 and 29 below and blended with a tumbler followed by compression granulation using a dry compression granulator (Roll Press DP-150) from Seishin Enterprise Co., Ltd., at 10 rpm and a processing rate of 30 kg/hour. The resulting granular phosphazene had a flat shape.

[Granulation Procedure B]

A phenoxyphosphazene compound (Rabitle FP-110) and the polycarbonate resin particulate were combined in the proportions given in Tables 28 and 29 below and blended with a tumbler, followed by compression granulation without the application of heat using a powder extrusion-type granulator and pelletization. The resulting granular phosphazene was a 3 mmφ pellet.

[The Granular Phosphazene Productivity]

During production by the granulation procedure as described above, an evaluation of "⊕" was made when the granular phosphazene could be produced unproblematically and the appearance was also good; an evaluation of "○" was made when production could be carried out, but the appearance was poor and powderiness occurred; and an evaluation of "×" was made when the granulatability was so poor that production could not be carried out.

[The Disintegrability of the Granular Phosphazene (Percentage Retained on a Sieve with an Aperture of 1680 μm)]

100 g of the obtained granular phosphazene compound was loaded on a sieve with an aperture of 1680 μm (from Kansai Wire Netting Co., Ltd.) and sieving classification was carried out by shaking for 5 minutes using a sieve shaker (AS200 from Retsch), after which the percentage (mass %) remaining on the mesh was calculated. A larger percentage remaining on the sieve with an aperture of 1680 μm indicates a smaller disintegrability and is thus preferred.

The granular phosphazene of the present invention is used for the purpose of melt-mixing after blending with polycarbonate resin, and a smaller disintegrability during this blend-

TABLE 27

| | polycarbonate resin particulate sample | | | | | | |
|---|---|---|---|---|---|---|---|
| | PC1 | PC2 | PC3 | PC4 | PC5 | PC6 | PC7 |
| viscosity-average molecular weight | 15500 | 21000 | 21000 | 21000 | 15500 | 16000 | 22000 |
| percentage passing a sieve with an aperture of 1000 μm (mass %) | 48.3 | 75.1 | 100 | 100 | 100 | 100 | 7.8 |
| percentage passing a sieve with an aperture of 500 μm (mass %) | 27.3 | 44 | 62.3 | 100 | 99 | 100 | 0.6 |
| percentage passing a sieve with an aperture of 106 μm (mass %) | 7.6 | 6.8 | 0.9 | 8 | 95.8 | 100 | <0.2 | ing results in a higher productivity—and is thus preferred—due to less sticking to the feeder internals and the screw during introduction into the extruder and during melt-mixing.

[The Blendability]

10 mass parts of the obtained granular phosphazene was combined with 100 mass parts of an aromatic polycarbonate resin (from Mitsubishi Engineering-Plastics Corporation, product name: Iupilon S-3000F, viscosity-average molecular weight: 21,000) and mixing for 20 minutes with a tumbler was carried out and the condition of the blend was then inspected. An evaluation of "⊕" was made when the granular phosphazene retained its shape; an evaluation of "○" was made when the shape was retained, but a reduction in size had occurred due to disintegration; and an evaluation of "×" was made when disintegration had occurred to the point that the shape was not maintained and the material had returned to a powder.

[The Mixability]

The blend obtained as described above was fed, using a screw feeder equipped with an agitator, to a twin-screw extruder equipped with 1 vent (TEX30HSST from The Japan Steel Works, Ltd.), and mixing was carried out at a screw rpm of 250 rpm, a discharge rate of 15 kg/hour, and a barrel temperature of 260° C. while continuing to feed for 60 minutes.

An evaluation of "⊕" was made when sticking to the feeder internals, agitator, screw, and extruder screw was entirely absent; an evaluation of "○" was made when minor sticking was observed, but was unproblematic in terms of production; and an evaluation of "×" was made when sticking was severe and stable feeding was very difficult and production was problematic.

These results are given in Tables 28 and 29.

TABLE 28

| | examples | | | | | | |
|---|---|---|---|---|---|---|---|
| | 65 | 66 | 67 | 68 | 69 | 70 | 71 |
| polycarbonate resin particulate (G) | PC1 | PC2 | PC3 | PC4 | PC5 | PC6 | PC6 |
| phosphazene compound (C)/polycarbonate resin particulate (G) mass ratio | 50/50 | 50/50 | 50/50 | 60/40 | 70/30 | 70/30 | 80/20 |
| granulation procedure | A | B | A | B | B | B | B |
| bulk density (g/mL) | 0.45 | 0.5 | 0.48 | 0.54 | 0.61 | 0.63 | 0.6 |
| granular phosphazene productivity | ○ | ○ | ⊕ | ⊕ | ⊕ | ⊕ | ⊕ |
| percentage (mass %) retained on a sieve with an aperture of 1680 μm | 65.1 | 74.2 | 68.8 | 90.4 | 97.3 | 99.2 | 94.3 |
| blendability | ○ | ○ | ○ | ○ | ⊕ | ⊕ | ⊕ |
| mixability | ○ | ○ | ○ | ○ | ⊕ | ⊕ | ⊕ |

TABLE 29

| | comparative examples | | |
|---|---|---|---|
| | 30 | 31 | 32 |
| polycarbonate resin particulate (G) | PC7 | PC7 | PC6 |
| phosphazene compound (C)/polycarbonate resin particulate (G) mass ratio | 50/50 | 70/30 | 90/10 |
| granulation procedure | B | B | B |
| bulk density (g/mL) | 0.51 | — | — |
| granular phosphazene productivity | ○ | × | × |
| percentage (mass %) retained on a sieve with an aperture of 1680 μm | 41.8 | — | — |
| blendability | × | — | — |
| mixability | × | — | — |

In Comparative Example 31, due to the use of a polycarbonate resin particulate for which the percentage passing a sieve with an aperture of 1000 μm was less than 30 mass %, collection into a granular shape did not occur and the productivity was very poor when the attempt was made to produce the granular phosphazene. In Comparative Example 32, the (C)/(G) mass ratio between the phosphazene compound (C) and the polycarbonate resin particulate (G) was outside the range of 85/15 to 5/95, and as a consequence the granulatability was poor and granulation could not be achieved.

Comparative Example 33

10 mass parts of a phenoxyphosphazene compound (Rabitle FP-110) was combined with 100 mass parts of an aromatic polycarbonate resin (Iupilon S-3000F) and mixing for 20 minutes with a tumbler was carried followed by feeding to a twin-screw extruder equipped with 1 vent (TEX30HSST from The Japan Steel Works, Ltd.). Mixing was performed at a screw rotation rate of 250 rpm at a barrel temperature of 260° C. and a discharge rate of 10 kg/hour. When feeding was attempted for 60 minutes, sticking to the root of the screw was seen after 30 minutes and sticking to the extruder inlet port was also seen after 60 minutes and stable production could not be carried out.

INDUSTRIAL APPLICABILITY

The polycarbonate resin composition of the present invention has an excellent flame retardancy, rigidity, impact resistance, warping resistance, and heat resistance and as a consequence can be broadly used as, for example, a material in the automotive sector, a material for electrical and electronic devices and equipment, a material for housing construction, and a material for the production of parts and components in other industrial sectors, and in particular can be advantageously used for components in, for example, information technology•mobile devices, e.g., computers, notebook computers, tablets, smart phones, and cell phones, and in office equipment, e.g., printers and copiers. It thus has a very high industrial applicability.

In addition, the granular phosphazene compound of the present invention is a phosphazene compound that provides an excellent productivity as well as an excellent processability during melt-mixing with a resin, and it enables an excellent and stable processability to be achieved free of problems such as sticking to the extruder screw during the production of a resin composition by melt-mixing with a polycarbonate resin using, for example, an extruder. As a consequence, it can be advantageously used for the production of various flame-retardant thermoplastic resin materials and thus has a very high industrial applicability.

The invention claimed is:

1. A polycarbonate resin composition comprising:
3 to 30 mass parts of (C) a phosphazene compound,
0.001 to 1 mass parts of (D) a fluoropolymer, and
100 mass parts of a total of a component (A) and a component (B) comprising 40 to 95 mass % of (A) a polycarbonate resin and 5 to 60 mass % of (B) at least one filler selected from the group consisting of a glass filler and a carbon fiber, wherein the phosphazene compound (C) is a granular phosphazene having a bulk density of 0.4 to 1.5 g/mL and is obtained by mixing (G) a polycarbonate resin particulate having a percentage passing a sieve with an aperture of 1000 μm of at least 30 mass %, into a phosphazene compound at a (C)/(G) mass ratio in a range of 85/15 to 5/95.

2. A polycarbonate resin composition comprising:
3 to 30 mass parts of (C) a phosphazene compound,
0.001 to 1 mass parts of (D) a fluoropolymer, and
100 mass parts of a total of a component (A) and a component (B) comprising 40 to 95 mass % of (A) a polycarbonate resin and 5 to 60 mass % of (B) at least one filler selected from the group consisting of a glass filler and a carbon fiber,
wherein the phosphazene compound (C) is a granular phosphazene compound that has a percentage retained on a sieve with an aperture of 400 μm of at least 55 mass % and that has a bulk density of 0.4 to 1.5 g/mL, and is obtained by mixing (G) a polycarbonate resin particulate having a percentage passing a sieve with an aperture of 1000 μm of at least 30 mass %, into a phosphazene compound at a (C)/(G) mass ratio in a range of 85/15 to 5/95.

3. The polycarbonate resin composition according to claim 1, wherein (B) comprises a glass filler, and the glass filler is at least one member selected from the group consisting of a glass fiber, a flat cross-section glass fiber, a glass flake, a milled glass fiber, and a glass bead.

4. The polycarbonate resin composition according to claim 3, wherein the glass filler comprises a flat cross-section glass fiber that has an average value of 10 to 50 μm for a major diameter of a fiber cross section and an average value of 1.5 to 8 for a ratio between the major diameter and a minor diameter.

5. The polycarbonate resin composition according to claim 3, wherein the glass filler comprises a glass flake that has an average thickness of 0.2 to 10 μm.

6. The polycarbonate resin composition according to claim 3, wherein the glass filler comprises a milled glass fiber that is a glass short fiber for which a ratio of an average fiber length to an average fiber diameter is not more than 10.

7. The polycarbonate resin composition according to claim 3, wherein the glass filler comprises the glass fiber and the glass flake in a glass fiber/glass flake mass ratio in a range of 5/95 to 95/5.

8. The polycarbonate resin composition according to claim 3, wherein the glass filler comprises the flat cross-section glass fiber and the glass flake in a flat cross-section glass fiber/glass flake mass ratio in a range of 5/95 to 95/5.

9. The polycarbonate resin composition according to claim 3, wherein the filler (B) comprises the glass fiber and the carbon fiber in a glass fiber/carbon fiber mass ratio in a range of 5/95 to 95/5.

10. The polycarbonate resin composition according to claim 3, wherein the filler (B) comprises the flat cross-section glass fiber and the carbon fiber at a flat cross-section glass fiber/carbon fiber mass ratio in a range of 5/95 to 95/5.

11. The polycarbonate resin composition according to claim 1, further comprising 0.5 to 10 mass parts of (E) an elastomer per 100 mass parts of the total of the polycarbonate resin (A) and the filler (B).

12. The polycarbonate resin composition according to claim 11, wherein the elastomer (E) is a graft copolymer obtained by graft polymerization on a rubbery polymer of at least one compound selected from the group consisting of an aromatic vinyl compound, a vinyl cyanide compound, and a (meth)acrylate ester compound.

13. The polycarbonate resin composition according to claim 1, further comprising 0.5 to 20 mass parts of (F) a styrenic resin per 100 mass parts of the total of the polycarbonate resin (A) and the filler (B).

14. The polycarbonate resin composition according to claim 13, wherein the styrenic resin (F) is an ABS resin and/or a styrene-acrylonitrile resin.

15. The polycarbonate resin composition according to claim 2, wherein (B) comprises a glass filler, and the glass filler is at least one member selected from the group consisting of a glass fiber, a flat cross-section glass fiber, a glass flake, a milled glass fiber, and a glass bead.

16. The polycarbonate resin composition according to claim 15, wherein the glass filler comprises a flat cross-section glass fiber that has an average value of 10 to 50 μm for a major diameter of a fiber cross section and an average value of 1.5 to 8 for a ratio between the major diameter and a minor diameter.

17. The polycarbonate resin composition according to claim 15, wherein the glass filler comprises a glass flake that has an average thickness of 0.2 to 10 μm.

18. The polycarbonate resin composition according to claim 15, wherein the glass filler comprises a milled glass fiber that is a glass short fiber for which a ratio of an average fiber length to an average fiber diameter is not more than 10.

19. The polycarbonate resin composition according to claim 15, wherein the glass filler comprises the glass fiber and the glass flake in a glass fiber/glass flake mass ratio in a range of 5/95 to 95/5.

20. The polycarbonate resin composition according to claim 15, wherein the glass filler comprises the flat cross-section glass fiber and the glass flake in a flat cross-section glass fiber/glass flake mass ratio in a range of 5/95 to 95/5.

21. The polycarbonate resin composition according to claim 15, wherein the filler (B) comprises the glass fiber and the carbon fiber in a glass fiber/carbon fiber mass ratio in a range of 5/95 to 95/5.

22. The polycarbonate resin composition according to claim 15, wherein the filler (B) comprises the flat cross-section glass fiber and the carbon fiber at a flat cross-section glass fiber/carbon fiber mass ratio in a range of 5/95 to 95/5.

23. The polycarbonate resin composition according to claim 2, further comprising 0.5 to 10 mass parts of (E) an elastomer per 100 mass parts of the total of the polycarbonate resin (A) and the filler (B).

24. The polycarbonate resin composition according to claim 23, wherein the elastomer (E) is a graft copolymer obtained by graft polymerization on a rubbery polymer of at least one compound selected from the group consisting of an aromatic vinyl compound, a vinyl cyanide compound, and a (meth)acrylate ester compound.

25. The polycarbonate resin composition according to claim 22, further comprising 0.5 to 20 mass parts of (F) a styrenic resin per 100 mass parts of the total of the polycarbonate resin (A) and the filler (B).

26. The polycarbonate resin composition according to claim 25, wherein the styrenic resin (F) is an ABS resin and/or a styrene-acrylonitrile resin.

* * * * *